(12) United States Patent
Thirumalainambi et al.

(10) Patent No.: US 8,337,208 B1
(45) Date of Patent: Dec. 25, 2012

(54) CONTENT ANALYSIS TO DETECT HIGH STRESS IN ORAL INTERVIEWS AND TEXT DOCUMENTS

(75) Inventors: Rajkumar Thirumalainambi, Cupertino, CA (US); Charles C. Jorgensen, Palo Alto, CA (US)

(73) Assignee: The United States of America as Represented by the Administrator of the National Aeronautics & Space Administration, Washington, DC (US)

( * ) Notice: Subject to any disclaimer, the term of this patent is extended or adjusted under 35 U.S.C. 154(b) by 553 days.

(21) Appl. No.: 12/622,374

(22) Filed: Nov. 19, 2009

(51) Int. Cl.
  *G09B 19/00* (2006.01)
  *G06Q 10/00* (2006.01)

(52) U.S. Cl. .......................... 434/219; 705/1.1; 705/7.42

(58) Field of Classification Search ................... 734/219, 734/236; 705/1.1, 7.11, 7.38, 7.42
See application file for complete search history.

*Primary Examiner* — Kesha Y. Frisby
(74) *Attorney, Agent, or Firm* — John F. Schipper; Robert M. Padilla

(57) ABSTRACT

A system of interrogation to estimate whether a subject of interrogation is likely experiencing high stress, emotional volatility and/or internal conflict in the subject's responses to an interviewer's questions. The system applies one or more of four procedures, a first statistical analysis, a second statistical analysis, a third analysis and a heat map analysis, to identify one or more documents containing the subject's responses for which further examination is recommended. Words in the documents are characterized in terms of dimensions representing different classes of emotions and states of mind, in which the subject's responses that manifest high stress, emotional volatility and/or internal conflict are identified. A heat map visually displays the dimensions manifested by the subject's responses in different colors, textures, geometric shapes or other visually distinguishable indicia.

8 Claims, 12 Drawing Sheets

CONTENT ANALYSIS TO DETECT HIGH STRESS IN ORAL INTERVIEWS AND TEXT DOCUMENTS

ORIGIN OF THE INVENTION

The invention described herein was made in the performance of work under a NASA contract and by an employee of the United States Government and is subject to the provisions of Section 305 of the National Aeronautics and Space Act of 1958, as amended, Public Law 85-568 (72 Stat. 435, 42 U.S.C. §2457), and may be manufactured and used by or for the Government for governmental purposes without the payment of any royalties thereon or therefore.

FIELD OF THE INVENTION

This invention relates to detection of deception, high stress or internal conflict in oral and written responses by a subject being interrogated.

BACKGROUND OF THE INVENTION

When a subject is interviewed, some of the subject's statements may be inaccurate, or even deceptive, because the subject has incomplete information, the subject is telling only part of the truth, or the subject is fabricating an answer that the subject knows is false. When an interview subject is habitually issuing statements that are known to be false, or only partly true, emotional and/or intellectual conflicts often arise within the subject, and these conflicts may become manifest by inconsistencies in use of different parts of speech or in logical relationships between statements. These inconsistencies are more subtle than inconsistencies in factual statements, and identification of these inconsistencies is more difficult, and less straightforward, than identification of factual inconsistencies.

What is needed is an automated method, not requiring manual analysis by the interrogator of the interview subject, that can identify presence of high stresses, volatile emotions and/or internal conflicts on the part of the subject. Preferably, the method should apply linguistic analysis, statistical analysis and emotional analysis to the response given by the subject.

SUMMARY OF THE INVENTION

These needs are met by the invention, which provides an approach, not relying upon manual analysis, for detecting probable deception by an interview subject, based on first, second and third statistical analyses and/or construction of a heat map from text answers and oral responses to questions received from the subject. The subject's use of particular language, including colloquialisms and word order in the subject's asserted home region, and knowledge of an asserted line of work, are also analyzed.

The interview subject's responses are analyzed by reference to different dimensions, with each dimension having a collection of words and phrases relating to an emotion or state of mind A subset of the dimensions is identified that is more prominent in the documents containing the subject's responses. This subset of dimensions is examined more closely to identify responses in which the subject manifests high stress, emotional volatility and/or internal conflict, each of which may indicate that the subject is being deceptive in some of the responses.

DESCRIPTION OF BEST MODES OF THE INVENTION

Figure 1A:
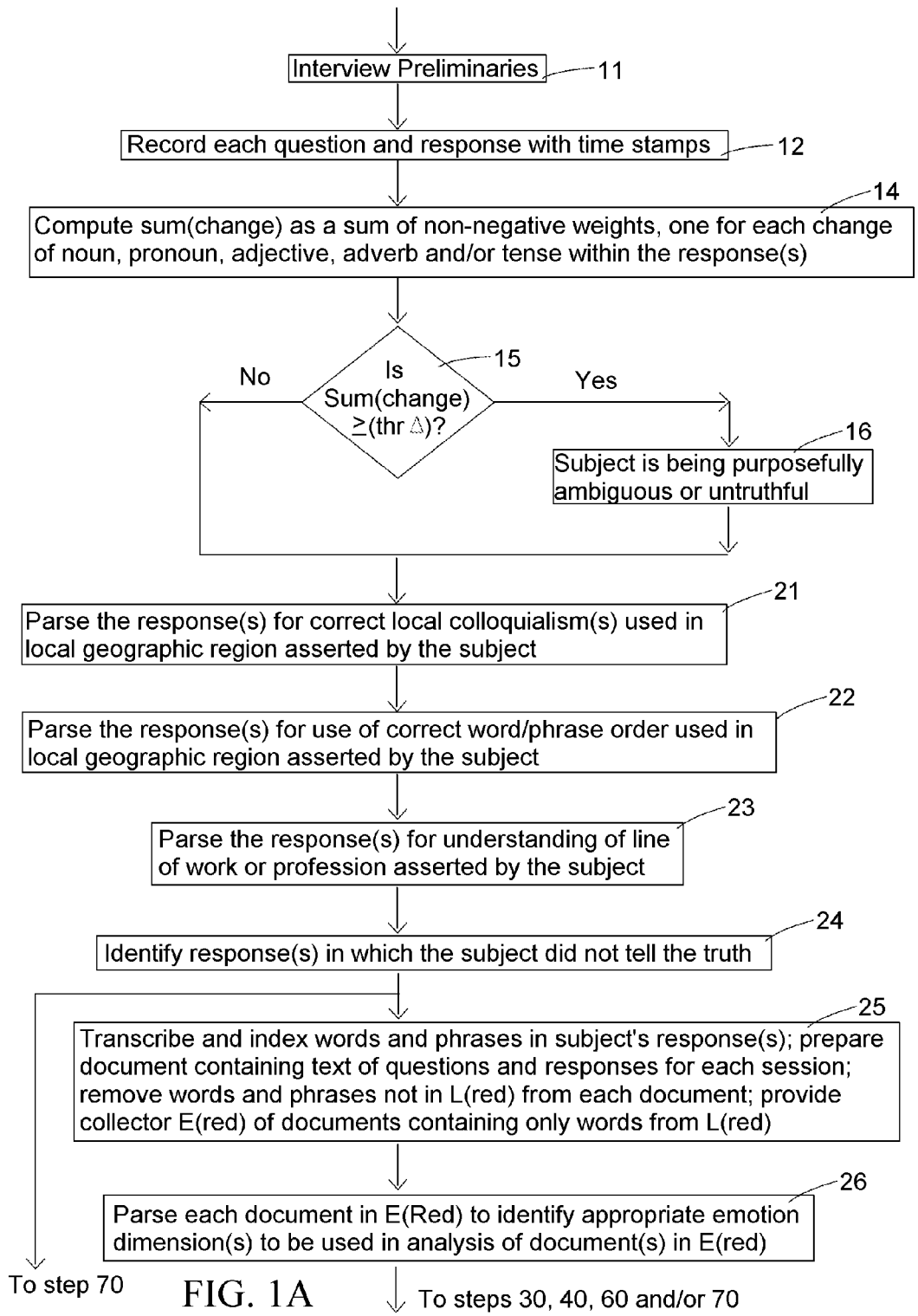
FIG. 1A/1B is a flow chart of a procedure for practicing the invention.

It is assumed here that an interview subject will provide oral responses and/or written or textual responses to interview questions and that both types of responses (text and transcribed) will be available for analysis, during and after the interview. FIG. 1A/1B is a flow chart of a procedure for practicing the invention. In step 11, the interview preferably begins with an explanation by the interviewer of the scope of the interview and an offer to stop and explain any question that is unclear to the interview subject. Optionally, the interviewer tries to establish some rapport with the subject.

In step 12, each question posed by the interviewer is recorded, optionally with (i) a first time stamp, indicating when the question was completed, (ii) a second time stamp, indicating when the subject began a response to the question, and (iii) a third time stamp, indicating when the subject completed the response to the question.

In step 13, the system parses each response by the subject to determine whether the subject: (i) has changed use of a personal pronoun within the response from a first personal pronoun to a subsequent different second personal pronoun (e.g., from "I" to "we," or from "me" to "us," from "you" to "us," or from "he/she" to "they."), (ii) has changed use of a pronoun number from a first pronoun number (e.g., singular or plural) to a subsequent different second pronoun number (e.g., plural to singular); (iii) has changed use of a first adjective or adverb to subsequent use of a different adjective or adverb; or (iv) has changed use of a first verb tense describing an action or event to a subsequent use of a second different verb tense describing the action or event (e.g., past to present, past to future, present to future)

In step 14, a numerical sum, denoted Sum(change), is computed as a sum of numerical weights, one such weight being assigned to each such change that is actually made by the subject in a response, with variable weight values. For example, a pronoun change such as "I" to "we," or "me" to "us" may be assigned a weight value of 10, and a change of "he/she" to "they" or of "him/her" to "them," may be assigned a weight value of 4.

In step 15, the Sum(change) is compared with a threshold value (thr$\Delta$), for example, the number 60. If Sum(change)>(thr$\Delta$), the system interprets this as indicating that the interview subject is being purposefully ambiguous or untruthful, in step 16.

In step 21, the system parses each response by the subject to determine if (i) the subject has asserted that he/she is from a specified geographic region SGR and (ii) if so, the subject has correctly used one or more colloquialisms that are commonly used (only) by natives in that SGR.

In step 22, the system parses each response by the subject to determine if (i) the subject has asserted that he/she is from a specified geographic region SGR and (ii) if so, the subject has correctly used a first word order, rather than a second word order, where (only) the first word order is used (only) by natives in the SGR.

In step 23, the system parses each response by the subject to determine if the subject (i) has asserted that he/she is engaged in a particular line of work or profession and (ii) has manifested a correct understanding of the principles and/or procedures and/or instruments and tools used in the line of work or profession.

In step 24, the system identifies any response(s) in which one or more assertions by the subject in steps 21, 22 and/or 23 was not truthful. The identified untruthful response(s) is/are later used by the system, in step 80.

In step 25, the system (i) provides a transcription of the subject's responses in each interview session, in one or more text documents or transcripts, (ii) removes specified groups GR of words and phrases (e.g., conjunctions, connectives, prepositions, articles), as specified in a "reduced dictionary" L(red), (iii) provides a collection E(red) of "reduced documents", containing only words from L(red), and (iv) indexes the words and phrases in a collection E(red) of text documents with words from L(red).

Figure 2:
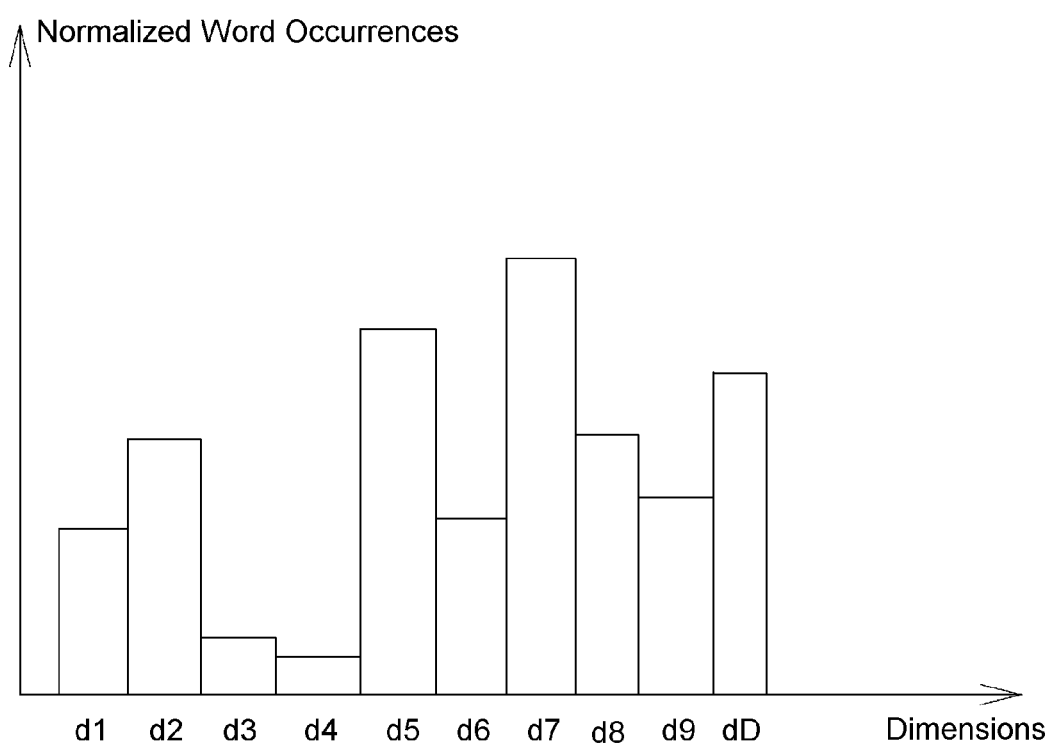
FIG. 2 illustrates a histogram comparing emotional dimensions.

In step 26, the system parses each document in E(red) to identify appropriate emotion dimensions to be used in analysis of documents in E(red). Each emotion dimension includes a list of words and phrases that are closely related to a given emotion. For example, Appendices F and G set forth two lists of dimensions (emotions or states of mind), corresponding to a Linguistic Inquiry Word Count (LIWC) format and a Buddhist format, respectively, that have been identified and used for particular purposes. The words and phrases that occur in each document in E(red) for each dimension are counted, with multiple occurrences being counted multiple times. The sum of occurrences in each dimension d, denoted Sum(d), is normalized by division of Sum(d) by the number of words N(doc) from L(red) that occur in that document. The normalized sum, Sum(d)/N(doc), is presented as a normalized histogram, illustrated in FIG. 2, with one histogram bar for each dimension d=d1, d2, . . . , dD in the document. The dimensions corresponding to histogram bars with the highest amplitudes (e.g., d2, d5, d7 and dD in FIG. 2) become the selected dimensions. Preferably, this selection process is performed one document at a time in E(red), in order to separately identify the most active dimensions in each of the documents. Alternatively, a single normalized histogram can be prepared by accumulating the normalized sums of occurrences of all the documents in E(red) at one time.

The system then proceeds along one or more of four document analysis paths, specified by steps 30-36, 40-49, 60-69 and/or 70-77, to identify documents in E(red), and responses in the identified document(s), that should be examined further in view of the interview subject's responses. That is, one, two, three or all four document analysis paths can be followed, a total of $2^4-1=15$ possible paths and combinations of paths.

In steps 30-35, the system performs a first statistical analysis, referred to herein as a binary hierarchical cluster (BHC) analysis, which is discussed in Appendix A.

In steps 40-48, the system performs a second statistical analysis, referred to herein as a rule-based dimension (RBD) analysis, which is discussed in Appendix B.

In steps 60-68, the system performs a third statistical analysis, referred to herein as a link analysis, which is discussed in Appendix C and D.

In steps 70-77, the system constructs and displays a Heat Map for one or more selected dimensions, as discussed in Appendix E.

In steps 39, 49 and 69, respectively, the system optionally computes a first stress index value, a second stress index value and a third stress index value, for the respective first statistical analysis, second statistical analysis and third statistical analysis, which allows determination of which documents, and which responses within the identified documents, may indicate presence in the subject of high stress In step 80, using information provided in steps 24, 30-36, 40-49, 60-69 and 70-77, the system identifies documents in E(red), and responses in such documents, that should be examined further for indications that the interview subject was experiencing high stress, emotional volatility and/or internal conflict.

In step 90, the system identifies at least one critical emotion or state of mind of the subject, and optionally prepares a report identifying this emotion or state of mind First Statistical Analysis: Binary Hierarchical Clustering.

In the BHC analysis, discussed in detail in Appendix A, a "reduced dictionary," denoted L(red), is used, including list of M words and/or phrases from which a selected group GR of parts of speech has been removed. In a preferred embodiment, GR consists of all articles (a, an, the, etc.), all connectives except "and," "or," and "not", all prepositions (of, above, etc.), and all interjections (uh, umm hmm, etc.). A set E of documents, transcribing the subject's responses to be examined, is replaced by a reduced set E(red), consisting of all documents from which the selected group GR of words has been removed. The reduced set E(red) of documents includes M words from L(red). A hierarchy is then formed, consisting of M+1 layers.

Layer 0, denoted as S{M|0}, consists of each document in E(red) that excludes all M words; that is, all words from L(red) are missing in that document; S{M|0} may be the empty set $\phi$. Layer 1, denoted S{M|1} consists of each reduced document in E(red) that contains precisely one word from L(red) (all other absent). The layer 1 collection S{M|1} has $\binom{M}{1}=M$ subsets, each containing a different word from L(red), many of which may be the empty set $\phi$. More generally, the collection S{M|i(m1), . . . , i(mp); d} consists of $\binom{M}{p}$ subsets of E(red), each subset being the reduced documents E(red) in which precisely the p specified words, i(m1), . . . , i(mp), from L(red) are present and belong to a specified dimension d.

Many of the subsets in S{M|i(m1), . . . , i(mp); d} may also be the empty set $\phi$. The set union S{M|0}U S{M|1}U S{M|2}U . . . U S{M|M−1}U S{M|M} consists of all subsets of documents in E(red) that have 0, 1, 2, . . . , M−1 or M words present from L(red), plus a number of copies of the empty set $\phi$.

This decomposition of E(red) can be used to determine or estimate, from the subsets that appear in the collection(s) S{M|i(m1), . . . , i(mp); d}, an interview subject's use of particular words that indicate presence of high stress, volatile emotions or internal conflict. Alternatively, this decomposition of E(red) can be used to indicate an interview subject's work background or profession or geographic region of upbringing or social background, among other things.

Second Statistical Analysis: Rule-Based Analysis Based on Dimensions.

Figure 1B:
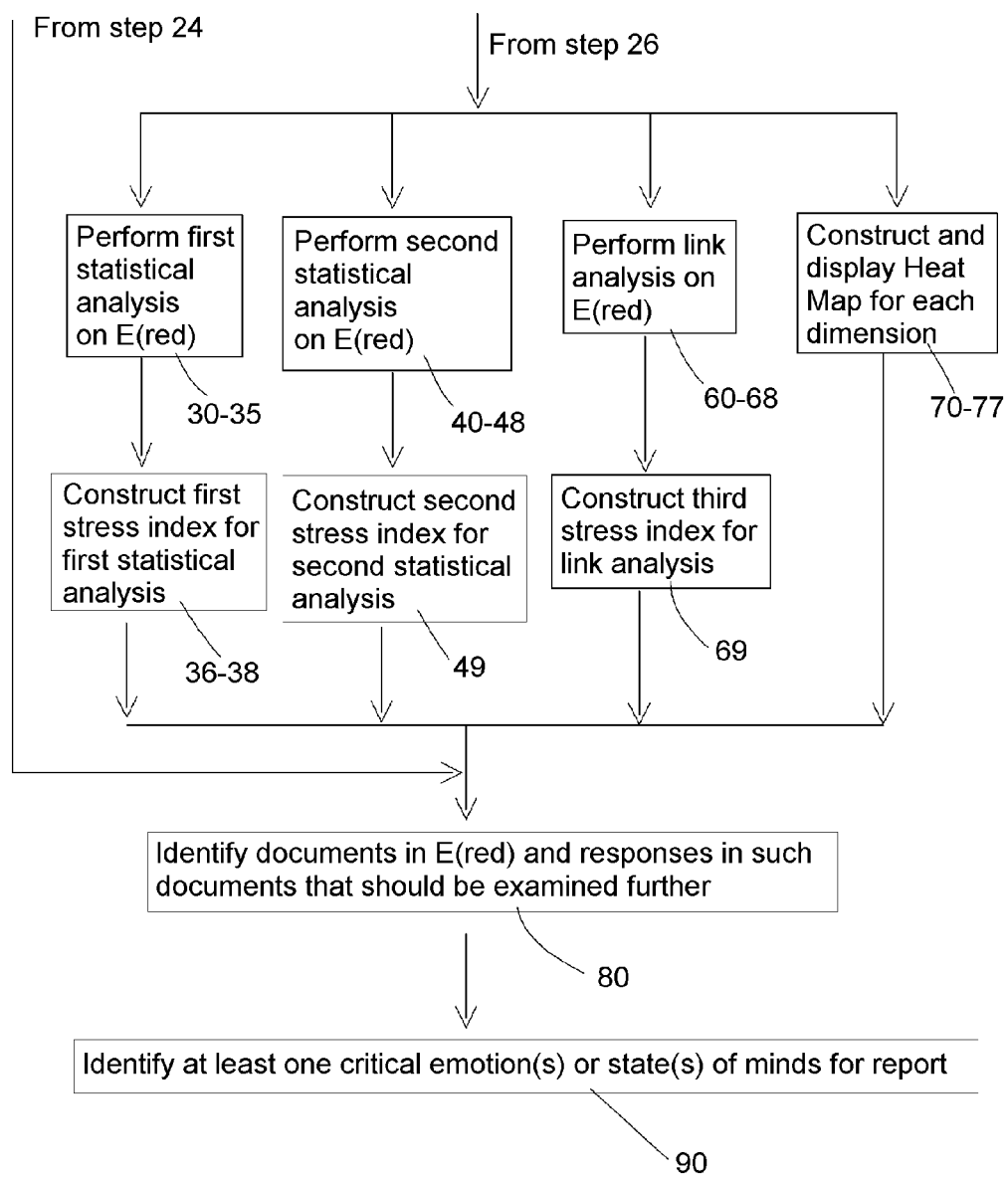

In an alternative portion of the statistical analysis, the system performs a rule-based analysis (RBA) and classification of the words and/or phrases, based on one or more rules defined by the user, in step 41-2 of the flow chart in FIG. 1, and this portion of the statistical analysis ends at step 44-2.

An example of an RBA is presented in Appendix B, where words with similar or closely related meanings are assigned to different dimensions. An example of such an assignment to dimensions is the Linguistic Inquiry Word Count (LIWC) approach proposed by Pennebaker, Francis and Booth (Appendix F), which works with K=64 dimensions, drawn from about 4509 distinct words, with each of these words being assigned to one or more dimensions. Because a word may appear in more than one dimension d, the word assignment is not "orthogonal," but may be more realistic than a strictly orthogonal assignment. After each of the words in the selected dictionary L(red) is assigned to one, or more than one, dimension, a subset of these D dimensions is chosen that represents, or is believed to represent, a state of mind of the interview subject that is indicative of high stress, volatile emotions and/or internal conflict.

Another example of an assignment of words to dimensions is based upon a Buddhist characterization of feelings, involving 12 dimensions and 119 distinct words, and is summarized in Appendix G.

The mean $\mu(d)$ and standard deviation $\sigma(d)$) of fractional occurrence of words (j=1, ..., J, where J is the number of documents) in each of the D dimensions (d=1, ..., D; represented by occurrence of a word i(m) from the dimension associated with d) are computed or otherwise provided for all words in the J documents in E(red). For each dimension d and a selected positive number k (preferably $k \geq 2$), an associated fraction F(d; k) is determined of all documents within L(red) for which the fractional occurrence f (d; j) of words in the dimension d in a document j satisfies $$f(d;j) \geq F(d;k) = \mu(d) + k \cdot \sigma(d) \quad (1)$$

For example, where k=2, the value F(d; k=2) represents a $2\sigma$ value, which has an associated probability of occurrence of about 2.5 percent for the dimension d for a normal distribution. Note that these probability values. $\mu(d)$ and $\sigma(d)$, are expressed for the collection of all words in a specified dimension d, not with reference to an individual word in that dimension. Where a particular document (e.g., transcription of an interview of a subject) has a dimension d whose fractional occurrence f(d; j) satisfies Eq. (1) for a selected positive value k, the document responses would be examined more closely to identify one or more responses, manifesting presence of high stress, emotional volatility and/or internal conflict, on which the subject would be questioned more closely.

Third Statistical Analysis: Link Analysis Based on Dimensions.

A Link Analysis is used to relate appearance of high stress words in the interview subject's responses (transcribed to one or more documents) to topics being covered in these document(s), beginning with a Venn diagram of overlapping dimensions. As an illustration, the effects of overlap of K=3 dimensions, dp, dq and dr (p, q, r=1, 2, 3, in any order), are analyzed. Three primary dimensions and four intersection dimensions are considered: dp, dq, dr, dp$\Omega$dq, dp$\Omega$dr, dq$\Omega$dr and dp$\Omega$dq$\Omega$dr. Relative or fractional probabilities, such as words in a higher order intersection dimension dp$\Omega$dq$\Omega$dr relative to words in lower order intersection dimensions, such as dp$\Omega$dq, dp$\Omega$dr, and dq$\Omega$dr, Where one or more computed fractional probabilities is greater than a selected threshold value, interest focuses on words belonging to dimensions in the higher order intersection dimensions. The link analysis for K=3 dimensions is extended to K=2 dimensions and to $K \geq 4$ dimensions in Appendix C.

Construction and Display of a Heat Map Based on Dimension Analysis.

Construction of a Heat Map begins with a count of the number of occurrences of words belonging to a selected dimension in each document in E(red). The document with the largest word count is assigned a first, visually distinguishable indicium, such as a first color, texture fill, geometric shape, etc. The document with the second largest word count is assigned a second, visually distinguishable indicium, such as a second color, texture fill, geometric shape, etc.; and so on. The resulting indicia for the collection of documents in E(red) for a (fixed) selected dimension can be displayed and can indicate which documents are most prominent in the selected dimension. This process can be iterated, using each of a sequence of selected dimensions, each with its own "spectrum" of visual indicia.

Appendix A. Description of Binary Hierarchical Clustering Procedure.

With reference to step 30, a first statistical analysis, referred to herein as binary hierarchical clustering ("BHC"), begins with a reduced dictionary L(red) in which words in a specified group GR, such as all articles (a, an, the, etc.), all connectives (and, or, but, etc.), all prepositions (of, above, etc.), and all pronouns (I, we, you, she, he, etc.), are removed. Each document in a reduced set E(red) of documents, with words drawn from L(red), is examined to determine which of the M words, denoted i(m) (m=1, ..., M), from L(red) is present in the reduced document. Define $$S\{M|0\}$$

to be the subset of reduced documents in E(red) where precisely 0 words from L(red) are present in this document. Define $$S\{M|i(m1), i(m2), \ldots, i(mp); d\}(i(m1), \ldots, i(mp) \text{distinct})$$

as the subset of reduced documents E(red) where precisely the words, indexed as i(m1), i(m2), ..., i(mp) and belonging to a specified dimension d, are present. The number of different subsets $S\{M|i(m1), i(m2), \ldots, i(mp); d\}$ with p fixed is $\binom{M}{p}$, many of which may be empty for a particular choice of the words i(m1), ..., i(mp). One can verify the inclusion $$S\{M|i(m1), \ldots, i(mp), i(m(p+1)); d\} S\{M|i(m1), \ldots, i(mp); d\}, \quad (A-1)$$

for fixed words i(m1), ..., i(mp), with i(m(p+1)) variable.

Let $\eta(Q; d)$ be the count of words in L(red) that are in the set Q and in a selected dimension d, with multiple appearances of a word counted just once. For the subset Q=$S\{M|i(m1), \ldots, i(mp); d\}$, define a coverage parameter $$CP\{Q\} = \eta\{S(M|i(m1), \ldots, i(mp)); d\}/n(d), \quad (A-2)$$

where n(d) is the number of distinct words in the dimension d. The coverage parameter is a fraction of all words in the dimension d that actually appear in the subset $S\{M|i(m1), \ldots, i(mp); d\}$. The coverage parameter satisfies $$0 \leq CP(S(M|i(m1), \ldots, i(m(p+1))); d\} \leq CP\{S(M|i(m1), \ldots, i(mp))\}; d\}\} \leq 1 \quad (A-3)$$

where i(m1), ..., i(mp) are fixed and i(m(p+1)) is variable, so that the sequence of coverage parameter values $CP\{S\{M|i(m1), \ldots, i(mp)\}; d\}$ is monotonically decreasing as p increases.

For at least one (fixed) dimension d, variable p and variable words $\{i(m1), \ldots, i(mp)\}$, the system identifies one or more coverage parameter values $CP\{S(M|i(m1), \ldots, i(mp)\}; d\}$ that are much larger than all other values in the collection $\{CP\{S(M|i(m1), \ldots, i(mp)\}; d\}\}_p$. Each of these maximal coverage parameter values corresponds to a subset of documents in E(red) containing the subject's responses. These corresponding subsets are identified and examined further to identify, where possible, responses from the subject that manifest high stress, emotional volatility and/or substantial internal conflict.

By appropriate choices of words, i(m1), ..., i(mp), in L(red), optionally including colloquial words or phrases that are used (only) in one or a few selected geographical regions, one can estimate the geographical region for which the interview subject is a native (referred to as a "home region"). By identification of the native region for the subject, some questions can be focused on that region, to determine if the subject is providing accurate or deceptive responses to questions relating to that region. This approach can also be used to estimate the working experience or profession of the interview subject. Examples of uses of the sets S{M|i(m1), i(m2), ..., i(mp); d} for these analyses are illustrated in FIGS. 3A, 3B and 3C.

Figure 3A:
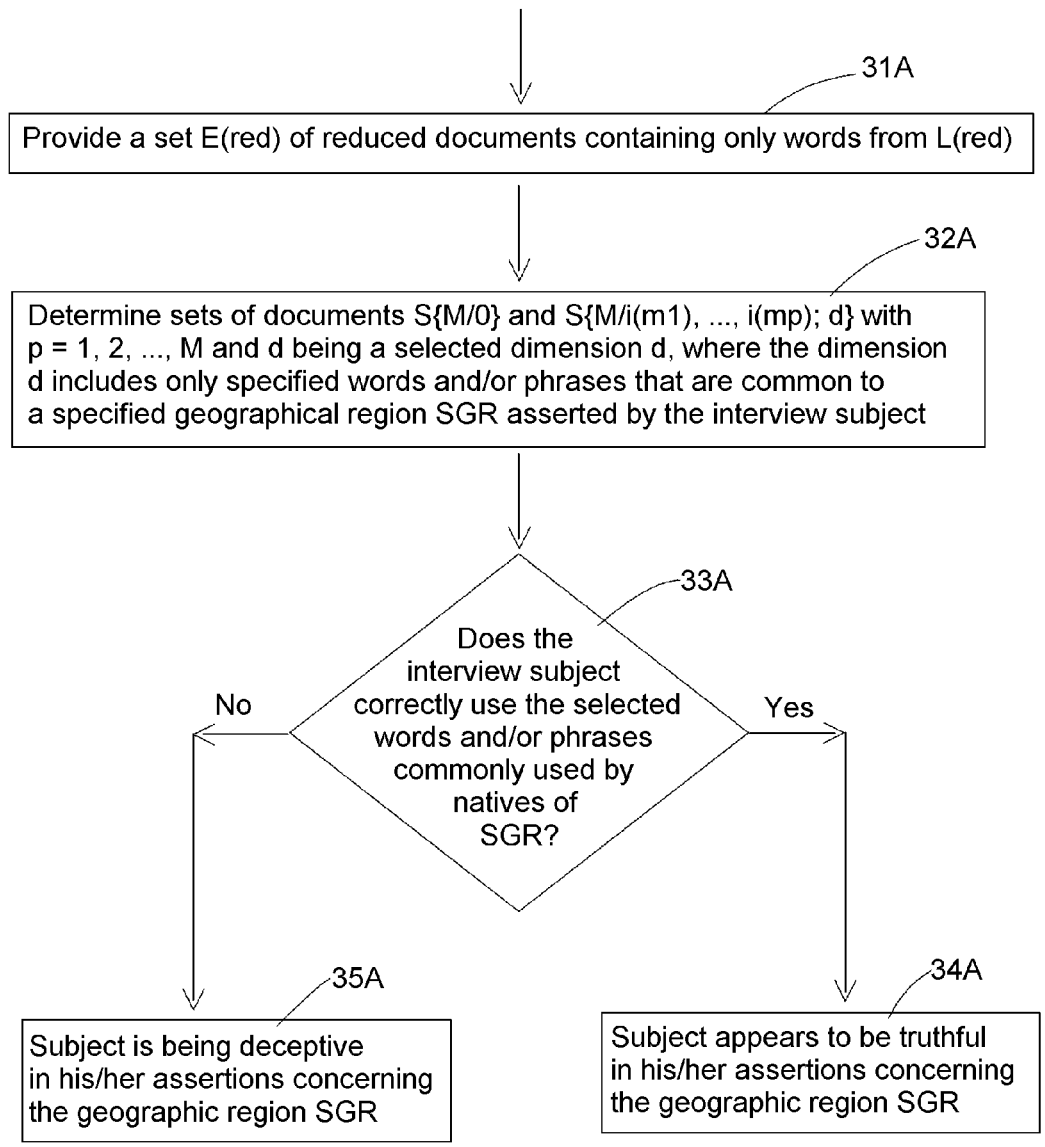
FIG. 3A/3B/3C illustrates a binary hierarchical clustering procedure.

FIG. 3A is a flow chart of a procedure for use of a BHC process to determine if the interview subject is native to a particular geographic region asserted as the home region by the subject. In step 31A, the system provides a set E(red) of reduced documents, including only words from L(red). The set E(red) will have documents containing many or all of the M words and/or phrases in L(red). In step 32A, the system determines the sets of documents S{M|0} and S{M|i (m1), ..., i(mp); d} (p=1, 2, ..., M), as discussed in the preceding, where the dimension d includes only (or predominantly) words and/or phrases that are common to a specified geographic region SGR for which the interview subject asserts he or she is a native. In step 33A, the system examines the subject's responses and determines, or estimates, if the interview subject correctly uses the selected words and/or phrases (optionally including unusual colloquialisms) commonly used by natives of SGR. If the answer to the query in step 33A is "yes" (optionally with modest allowance for misuse of an occasional word and/or phrase), the system interprets this condition, in step 34A, as indicating that the subject appears to be truthful in his/her assertions concerning the present or past geographic region SGR. If the answer to the query in step 33A is "no," the system interprets this condition, in step 35A, as indicating that the subject appears to be deceptive in his/her assertions concerning the present or past geographic region SGR. Classification of the answer to the query in step 33A is one of many issues that are considered by the system in detecting the possibility of deception in the subject's responses.

Figure 3B:
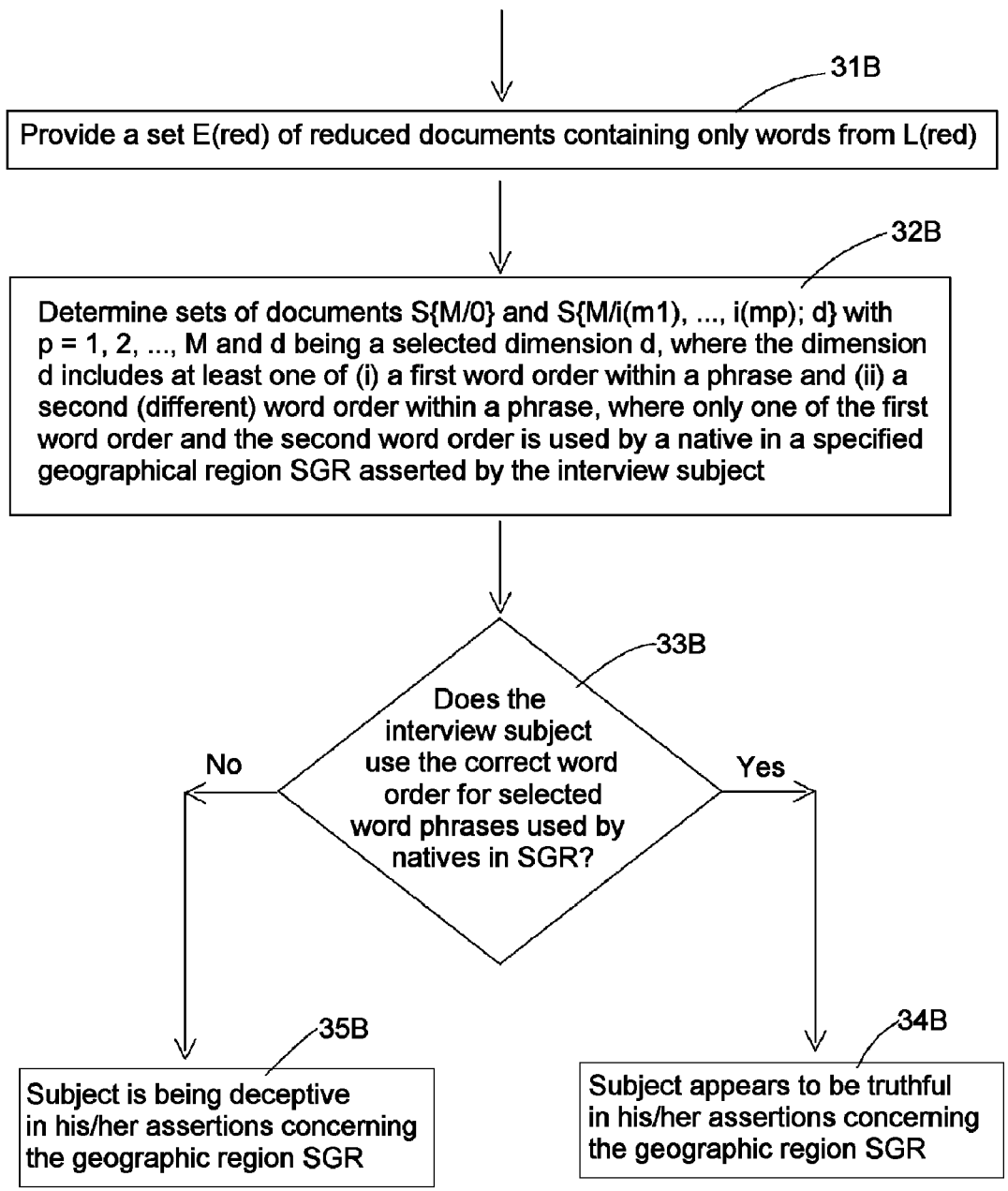
Figure 3C:
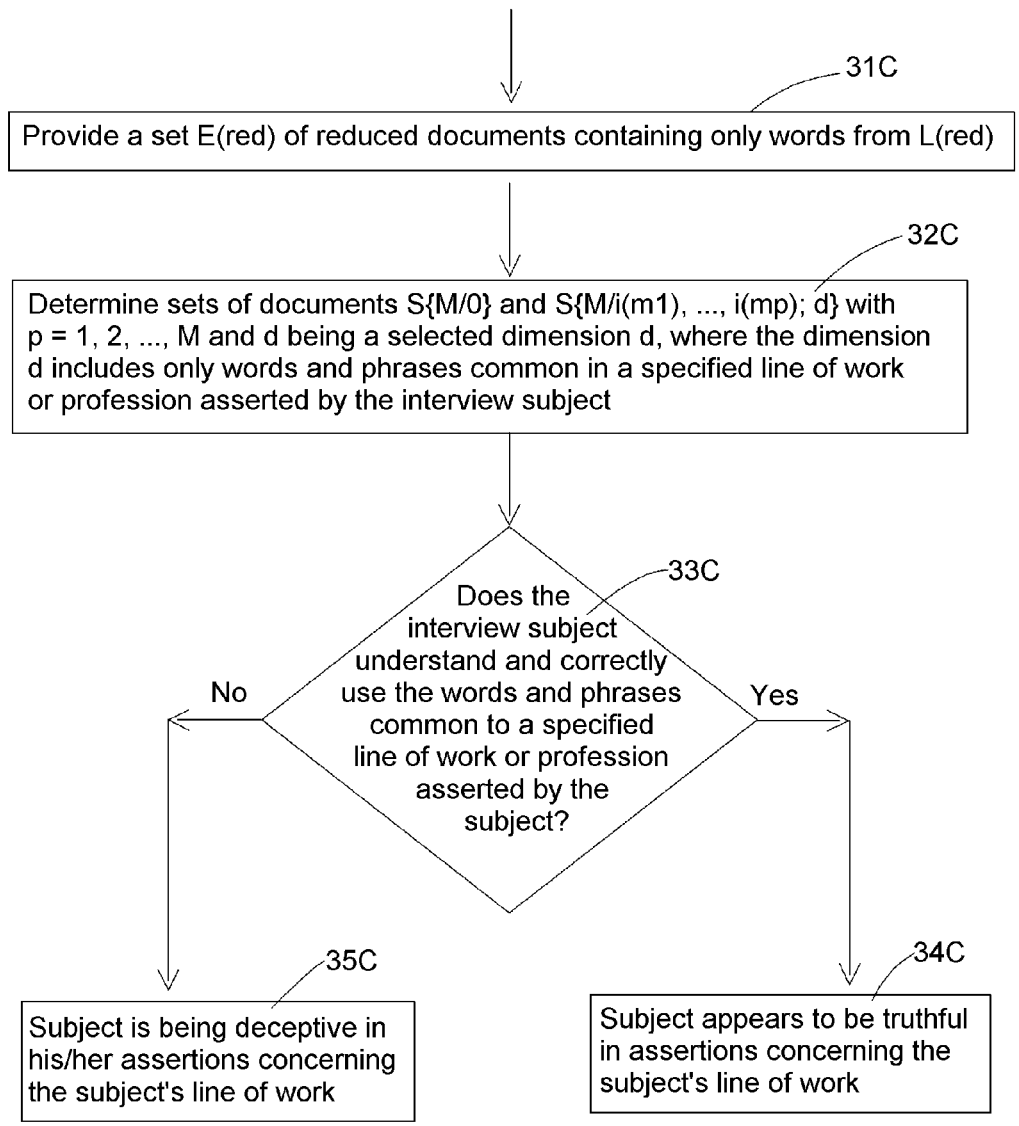

FIG. 3B is another flow chart for use of a BHC process to determine if the interview subject is native to a particular geographic region within a country. Step 31B is substantially the same as step 31A in FIG. 3A. In step 33B, the user selects word phrases, indexed as i(m1), ..., i(mp), in which a native of a first region and a native of a second region will use a first order and a second (different) order within a word phrase, respectively, where the first and second orders are reversed or otherwise distinguishable. Consistent use of a particular order by a "native" of that home region will clearly indicate from which of two or more regions the speaker comes.

In step 33B, the system examines the subject's responses and determines, or estimates, if the interview subject correctly uses the selected word phrase, (optionally including unusual colloquialisms) commonly used by natives of SGR, in the correct order (first or second). If the answer to the query in step 33B is "yes" (optionally with modest allowance for misuse of an occasional misordering in a word phrase), the system interprets this condition, in step 34B, as indicating that the subject appears to be truthful in his/her assertions concerning the present or past geographic region SGR. If the answer to the query in step 33B is "no," the system interprets this condition, in step 35B, as indicating that the subject appears to be deceptive in his/her assertions concerning the present or past geographic region SGR.

FIG. 3C is a flow chart of a procedure for use of a BHC process to determine if the interview subject has worked in a specified profession or line of work. Step 31C is substantially as in step 31A. In step 32C, the user selects words, indexed as i(m1), ..., i(mp) in L(red) so that S{M|i(m1), ..., i(mp); d} contains only words and phrases common to a specified line of work or profession asserted by the interview subject. In step 33C, the system determines if the interview subject understands and uses correctly the words and phrases common to a specified line of work or profession asserted by the interview subject. If the answer to the query in step 33C is "yes" (optionally with modest allowance for misuse of an occasional misuse of a relevant word or phrase), the system interprets this condition, in step 34C, as indicating that the subject appears to be truthful in his/her assertions concerning his/her line of work or profession. If the answer to the query in step 33C is "no," the system interprets this condition, in step 35C, as indicating that the subject appears to be deceptive in his/her assertions concerning his line of work or profession.

The procedure set forth in FIG. 3A or FIG. 3B or FIG. 3C can be used to test the accuracy of any statement made by the subject, asserting that the subject belongs to a particular group of residents, is or has been employed in a particular line of work, has specialized training, or similar exposure to a particular milieu that uses its own colloquialisms that are not commonly used outside that milieu. Any document in E(red) in which a discrepancy occurs should be re-examined more closely to identify other possible factual inaccuracies in the response(s) by the subject.

After the first statistical analysis has been applied to test the accuracy of the subject's responses, one or more of the statements made by the subject may be determined to be untruthful. A first stress index value SI1 is computed or estimated, in step 36, by computing a numerical sum, over all the untruthful statements (k) in all the documents (j), of weights associated with each of these untruthful statements.

$$SI1 = \Sigma_{j,k} w(\text{untruth } k;j) \qquad \text{(A-1)}$$

Each weight w(untruth k; j) is preferably determined independently, depending on the estimated consequence(s) of acceptance of the untruthful statement as "true," and each such weight may have a different value, or many weights may have the same value. This first stress index value SI1 is optionally compared with a first stress index threshold value (thr1), in step 37. Where the first stress index is larger than (thr1), the system optionally determines whether the subject requires further interview concerning matters associated with one or more of the untruthful statements, in step 38.

Appendix B. Description of Rule-Based Analysis.

Consider a collection of J documents, each having a linearly ordered sequence of words and/or phrases, with each word consisting of an ordered sequence of alphanumeric characters (letters and numerals) and other symbols (punctuation, mathematical symbols, other symbols). The set S of all alphanumeric words and other symbols that appear in at least one document, with articles (the, a, an, etc) and connectives (and, or, but, etc.) and prepositions (of, above, etc.) deleted, is now expressed as a reduced set S(red), with each word appearing at most once. Optionally, the words and symbols that appear in E(red) are arranged alphabetically, or according to an ASCII arrangement A reduced document, denoted doc(red), is a document in which all articles, connectives and prepositions are deleted.

For a given word in L(red), indexed as i(m), let w(i; j) be the number of times the word i appears in the reduced document number j (j=1, ..., J; J≧1). The number of occurrences of the word i(m) in the document j can be weighted in several manners: (1) if w(i(m), j)=1, the weight is uniform; (2) if the weight is linear w(i(m), j)=x (number of occurrences x of the word); (3) if the weight is logarithmic, this is expressed as w=$\log_a \{M \cdot x^q\}$, where q>0 and a>1, so that w(x=M)= (1+q)·w(x=1); (4) any other strictly monotonically increasing weight prescription can be used here. The third choice of weighting takes account of a law of diminishing returns and is perhaps more realistic. For purposes of illustration, a standard linear weighting is used here: each occurrence of each word in the dimension d receives a weight of 1.

Preferably, each word in L(red) is allocated to one or more "dimensions" d, which are groups of words that are not necessarily synonyms but are closely related and may be associated with the same or a similar response by the interview subject. The Pennebaker-Francis-Booth Linguistic Inquiry Word Count (LIWC) approach provides an example of such dimensions, 64 according to one count, with each word being assigned to at least one dimension and some words being assigned to more than one dimension. The dimensions include five pronoun classifications, plus negations, assents, articles, connectives, prepositions, etc. A given dimension may have a few hundred words assigned. For example, the dimension "anger" includes 184 of the total of 4509 different words. For further analysis, the individual word i(m) is replaced by a dimension, denoted d (referring to a collection of all related words appearing in the dimension d). Other examples of dimensions lists include the 12 dimensions of emotions recognized in the Buddhist religion and summarized in Appendix G.

Figure 4A:
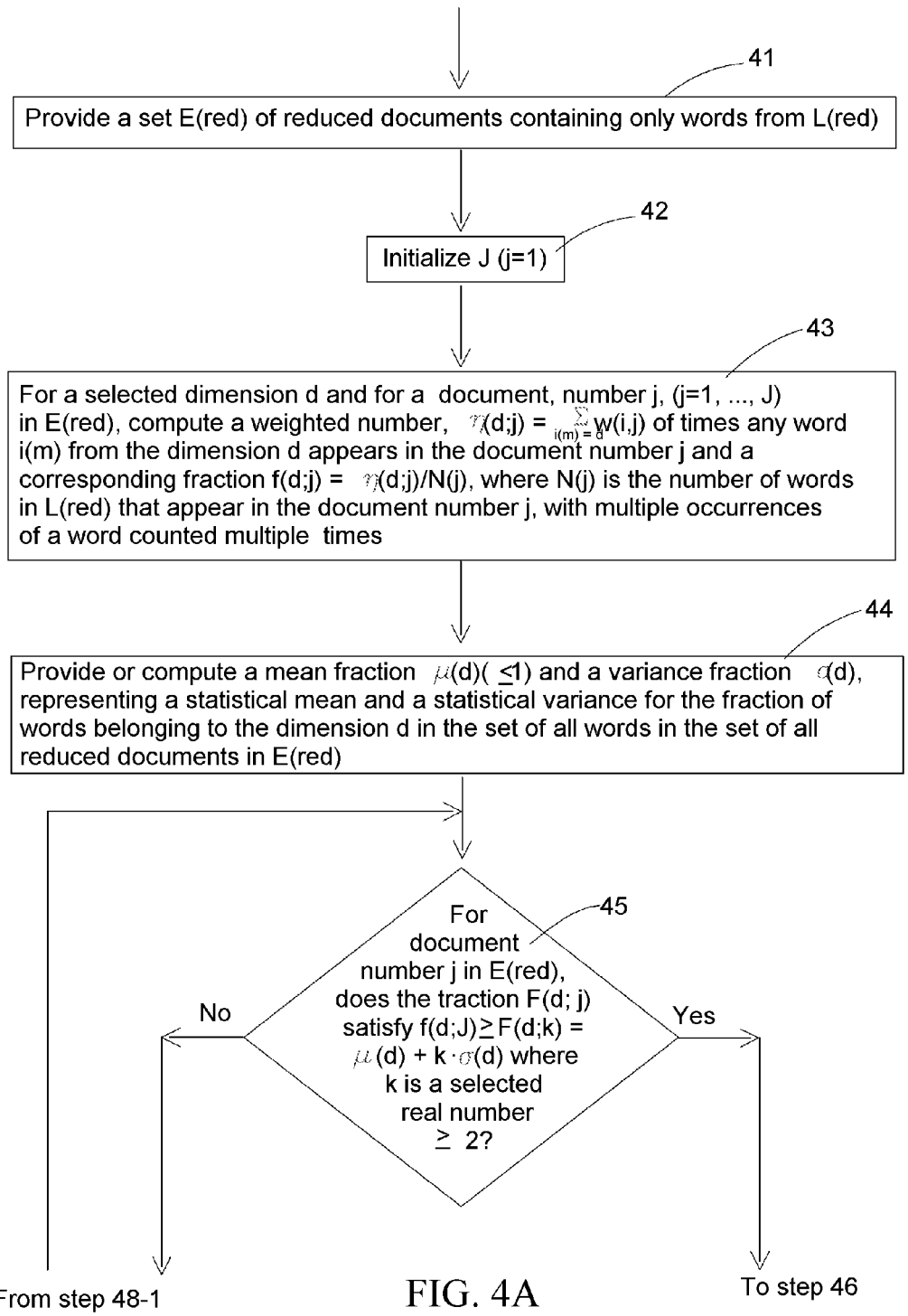
FIG. 4A/4B illustrates a rule-based analysis.
Figure 4B:
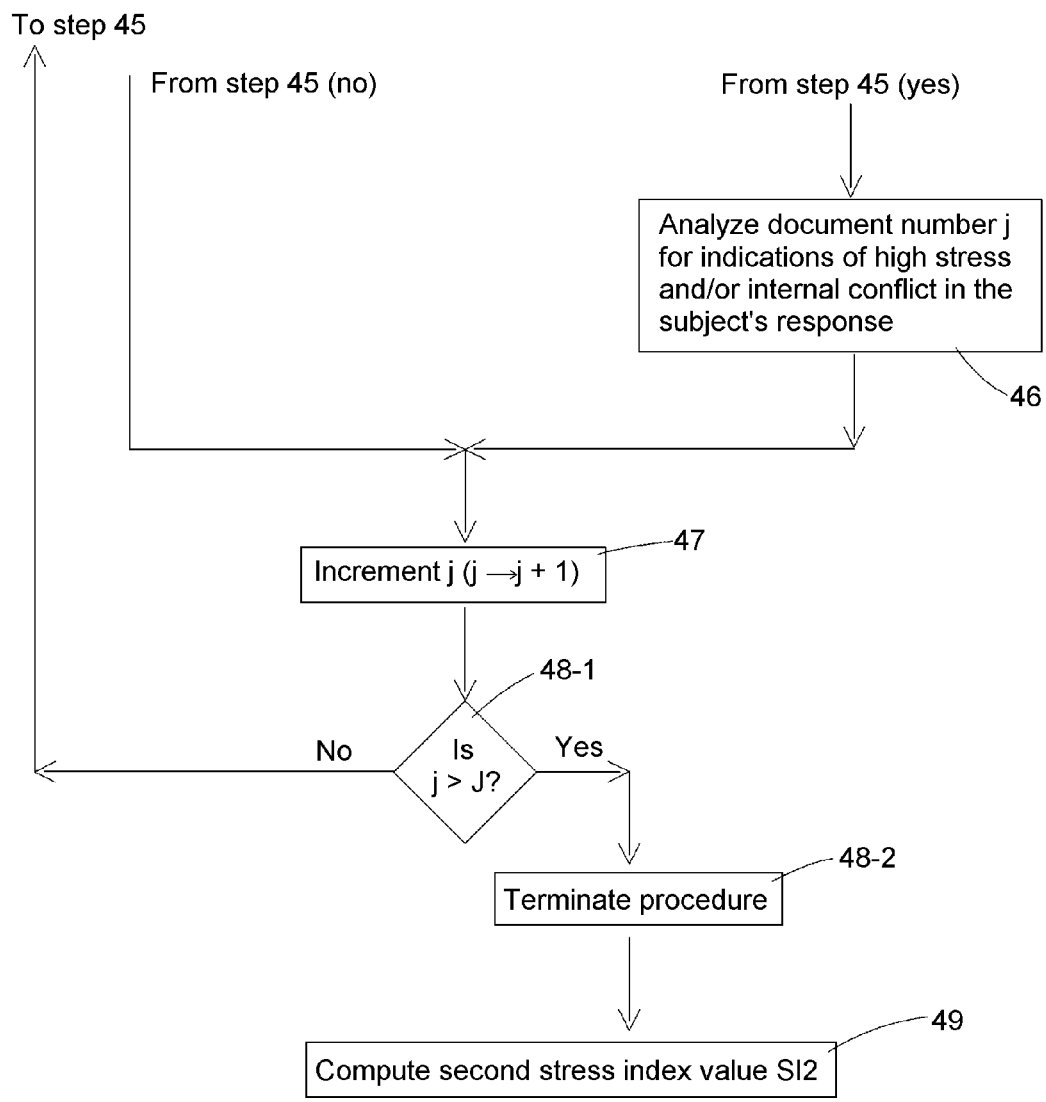

FIGS. 4A and 4B are a flow chart of an embodiment of a procedure for implementing the rule based analysis (RBA). In step 41, a set E(red) of reduced documents is provided, containing only words from L(red). In step 42, a counting index j is initialized (j=1), with j representing the document number in E(red).

In step 43, the number of occurrences $$\eta(d;j) = \Sigma w(i(m);j)$$
$$i(m) \in d \quad (B-1)$$

of all words belonging to the dimension d in the document j is computed, and the fractional occurrences $$f(d;j) = \eta(d;j)/N(j) \quad (B-2)$$

of all words belonging to the dimension d is computed, where N(j) is the number of words in the document j, with multiple occurrences counted a corresponding (multiple) number of times.

It is assumed here that a distribution of a word dimension d in a reduced document can be represented as a (nearly) normal statistical distribution, with mean μ(d) of fraction of words in E(red) that belong to the dimension d, and corresponding standard deviation σ(d) for the fraction. The values μ(d) and σ(d) are provided or computed in step 44.

In step 55, the system determines if, for the document j in E(red) and the dimension d, the fraction f(d; j) satisfies $$f(d;j) > F(d;k) = \mu(d) + k \cdot \sigma(d), \quad (B-3)$$

where k is a selected positive number (preferably k≧2); that is, the fraction f(d; j) lies in the upper k-σ range for that dimension. If the answer to the query in step 45 is "yes," the system recommends or requires that the document number j be analyzed for indications that the interview subject's responses are manifesting high stress, emotional volatility and/or internal conflict, in step 46. The system then moves to step 47. If the answer to the query in step 45 is "no," the system proceeds directly to step 47, The system then increments the counting index j (j→j+1), in step 47, and determines, in step 88, if the incremented index j satisfies j>J? If the answer to the query in step 48-1 is "yes," the system terminates the procedure, in step 48-2, because no more documents remain to be examined. If the answer to the query in step 48-1 is "no," the system returns to step 45 with an incremented document number j.

For a normally distributed variable f(d; j), the choices k=1, k=2 and k=3 correspond to a tail of the statistical distributions that are about 15.8 percent, 2.3 percent and 0.2 percent, respectively, of the total number of occurrences of the word dimension d in the collection of reduced documents. The statistical distribution associated with a word dimension d is determined by ignoring presence of words in a specified group G, such as articles (a, an, the, etc.), connectives (except the logical connectives and, or, not) and prepositions (of, above, etc.). In one approach, interest focuses on words in the following dimensions d:

ambiguity, uncertainty, tentativeness anger anxiety, fear (presence of) death or dying or severe injury or severe disease discrepancy, inconsistency financial concerns, money problems health concerns, body status inhibition, personal constraints (feelings of) irrelevance sadness, depression self-exclusion and exclusion by others where the fraction f(d) of words in the word dimension d satisfies Eq. (B-1). Other word dimensions, not set forth above, can be included in this analysis.

Each reduced document, for which a fraction f(d; j) associated with a word dimension d satisfies Eq. (B-3), is examined further with reference to each such word dimension and the content of this document, for the presence of high stress, emotional volatility and/or internal conflict. Where a particular document, or small group of documents, manifests a "high-a response," corresponding to f(d)≧f(d; k) with k≧2 or k≧3 for example, the interviewer or analyst should focus on the topic(s) covered in that document, where the interview subject is likely to manifest high stress, emotional volatility and/or internal conflict. Optionally, the topic(s) in this document can be revisited with further probing questions that focus on the corresponding dimension.

After the second statistical analysis has been applied to identify which document(s) j and which dimensions d within these document(s) satisfy the condition in Eq. (B-3), a second stress index value is computed or estimated, in step 49, for each (fixed) document j, that takes account of (i) an increment, Δ(d; j)=f(d; j)−F(d; k) from Eq. (B-3) and (ii) the number and nature of the dimensions that satisfy Eq. (B-3) for the (fixed) document j. For example, the second stress index value in step 49 may be computed as $$SI2(j) = \sum_{d} \varepsilon\{f(d;j) - F(d;k)\} \cdot w(d;j) \quad \text{(B-4)}$$

$$\varepsilon\{x\} = x \quad (x > 0)$$
$$= 0 \quad (x \leq 0), \quad \text{(B-5)}$$

where w(d) is a numerical weight value that takes account of the number and nature of the dimensions that satisfy Eq. (B-3) for the (fixed) document j. The larger the second stress index value SI2(j), the more likely that the document number j, and the associated dimensions d within this document, should be re-examined for evidence of high stress, emotional volatility and/or internal conflict on the part of the interview subject.

Appendix C. Link Analysis.

A Link Analysis is used to relate appearance of high stress words in the interview subject's responses (transcribed to one or more documents) to topics being covered in these document(s). As an illustration, consider the Venn diagram in FIG. 5, in which a first set, a second set and a third set of documents in E(red) 0f words from L(red), labeled as "d1," "d2" and "d3," respectively, each contain one or more words from a first dimension d1, from a second dimension d2 and from a third dimension d3, respectively. The number of regions of interest here is $7=2^3-1$: the three regions labeled d1, d2 and d3, and the intersection or overlap regions, d1Ωd2, d1Ωd3, d2Ωd3 and d1Ωd2Ωd3, which contain documents that simultaneously belong to two or more of the regions, d1, d2 and/or d3. The sets labeled d1, d2 and d3 include documents that contain words in L(red) from only a single primary dimension (e.g., d1−(d1Ωd2)−(d1Ωd3)) include documents that simultaneously contain words from only first and second primary dimensions (e.g., (d1Ωd2)−(d1Ωd3)−(d2Ωd3), and include documents that contain words from all three dimensions (d1Ωd2Ωd3). This analysis extends to any number $K \geq 2$ of dimensions.

Let η(dp; np) be the number of times any word from the dimension dp (p=1, 2, 3) appears in document number np (np=1, . . . , Np) of the set of documents labeled dp. Similarly, let η(dp/q; np/q) be the number of times any word from the intersection dimension dp Ωdq (p, q=1, 2, 3; p≠q) appears in document number np/q (np/q=1, . . . , Np/q) of the set of documents in the dimension intersection dp Ωdq; and let η(dp/q/r; np/q/r) be the number of times any word from the intersection dimension dpΩdqΩdr (p, q, r=1, 2, 3; p≠q≠r) appears in document number np/q/r (np/q/r=1, . . . , Np/q/r) of the set of documents in the dimension intersection dpΩdqΩdr.

Let W(dp), W(dq) and W(dr) be the number of words (with multiple countings of a word included, where present) within L(red) belonging to the dimensions dp, dq and dr, respectively, for the set of documents examined. Let W(dpΩdq) and W(dpΩdqΩdr) be the corresponding words within L(red) that belong to dpΩdq and to dpΩdqΩdr, respectively. Let W(D) be the number of words in the set D (with multiple countings of a word included, where present) within L(red) that appear in any of the dimensions. The fractions of words within the set D that belong to the dimensions dp, dq or dr are W(dp)/W(D), W(dq)/W(D) or W(dr)/W(D), respectively.

The fractions of words in a document number np belonging to the dimension dp is η(dp; np)/W(dp). The fraction of words in a document number np/q belonging to the intersection dimension dpΩdq is η(dp/q; np/q)/W(dpΩdq). The fraction of words in a document number np/q/r belonging to the intersection dimension dpΩdqΩdr is η(dp/q/r; np/q/r)/W(dpΩdqΩdr).

Each of the fractions $$f_3(dp) = \eta(dp;np)/W(dp)/\{W(dp)/W(D)\} = \eta(dp;np)W(D)/W(dp)^2, \quad \text{(C-1)}$$

$$f_3(dq) = \eta(dq;nq)W(D)/W(dq)^2, \quad \text{(C-2)}$$

$$f_3(dr) = \eta(dr;nr)W(D)/W(dr)^2, \quad \text{(C-3)}$$

$$f_3(dp/q) = \eta(dp/q;np/q)W(D)/W(dp\Omega dq)^2, \quad \text{(C-4)}$$

$$f_3(dq/p) = \eta(dq/p;nq/p)W(D)/W(dp\Omega dq)^2, \quad \text{(C-5)}$$

$$f_3(dp/r) = \eta(dp/r;np/r)W(D)/W(dp\Omega dr)^2, \quad \text{(C-6)}$$

$$f_3(dr/p) = \eta(dr/p;nr/p)W(D)/W(dp\Omega dr)^2, \quad \text{(C-7)}$$

$$f_3(dq/r) = \eta(dq/r;nq/r)W(D)/W(dq\Omega dr)^2, \quad \text{(C-8)}$$

$$f_3(dr/q) = \eta(dr/q;nr/q)W(D)/W(dq\Omega dr)^2, \quad \text{(C-9)}$$

$$f_3(dp/q/r) = \eta(dp/q/r;np/q/r)W(D)/W(dp\Omega dq\Omega dr)^2, \quad \text{(C-10)}$$

is computed and is compared to the value 1.0. When, for example, f(dq/r)>>1.0 (e.g., f(dq/r)=2.1), this indicates that the fraction of words belonging to dimension dq in document nq/r in the intersection dimension dqΩdr is much larger than the fraction of words in the dimension dq in the document nq. The particular emotion or other human perspective in the documents labeled dqΩdr is thus much stronger, and the interview subject's responses for the documents in dqΩdr (e.g., nq/r) should be re-examined for evidence of high stress, emotional volatility and/or internal conflict.

Figure 5:
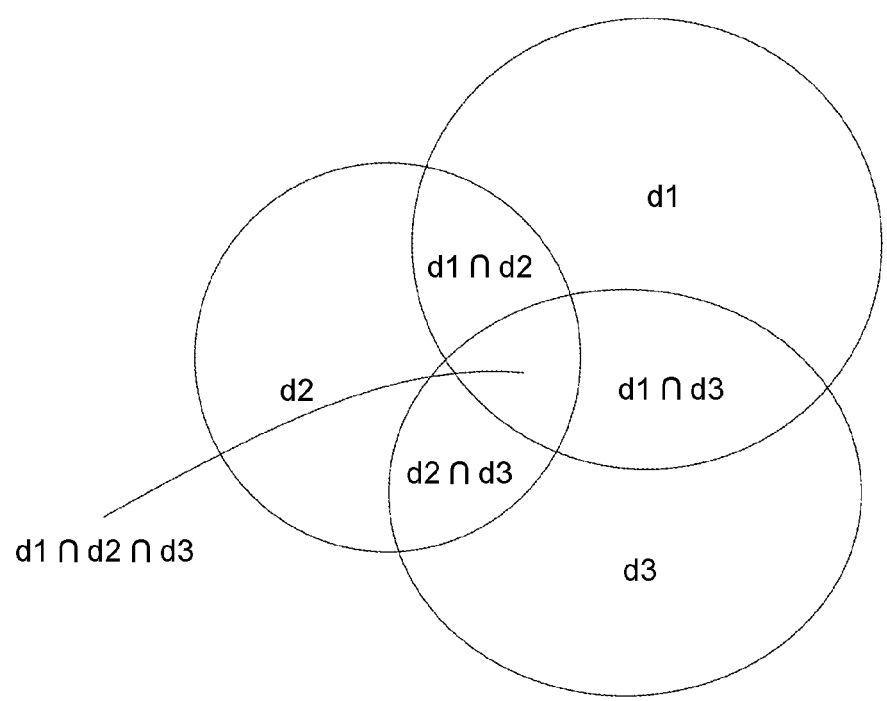
FIG. 5 is a Venn diagram used to illustrate a link analysis and a differential analysis according to the invention.

The Venn diagram in FIG. 5, involving intersections of first, second and third sub-collections of documents containing words belonging to the respective dimensions d1, d2 and d3, can be generalized, for link analysis, to a Venn diagram involving intersections of sub-collections, numbered k=1, 2, . . . , K (K≥2), of documents containing words belonging to the respective dimensions d1, d2, . . . , dK, with a corresponding modification in notation associated with the inter-section sets of dimensions d1', . . . , dk' (k'=2, . . . , K).

Figure 6A:
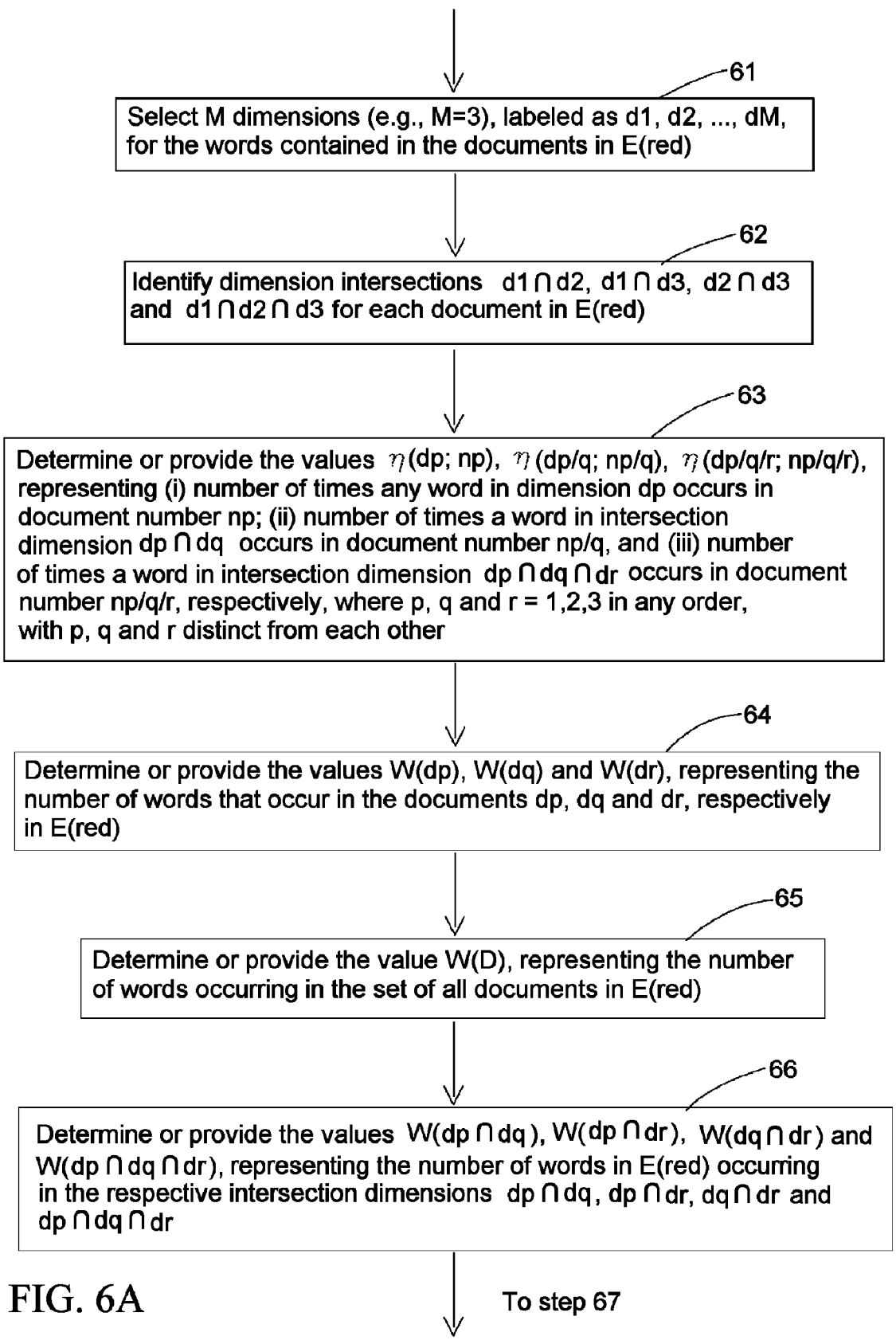
FIG. 6A/6B is a flow chart for a link analysis procedure.
Figure 6B:
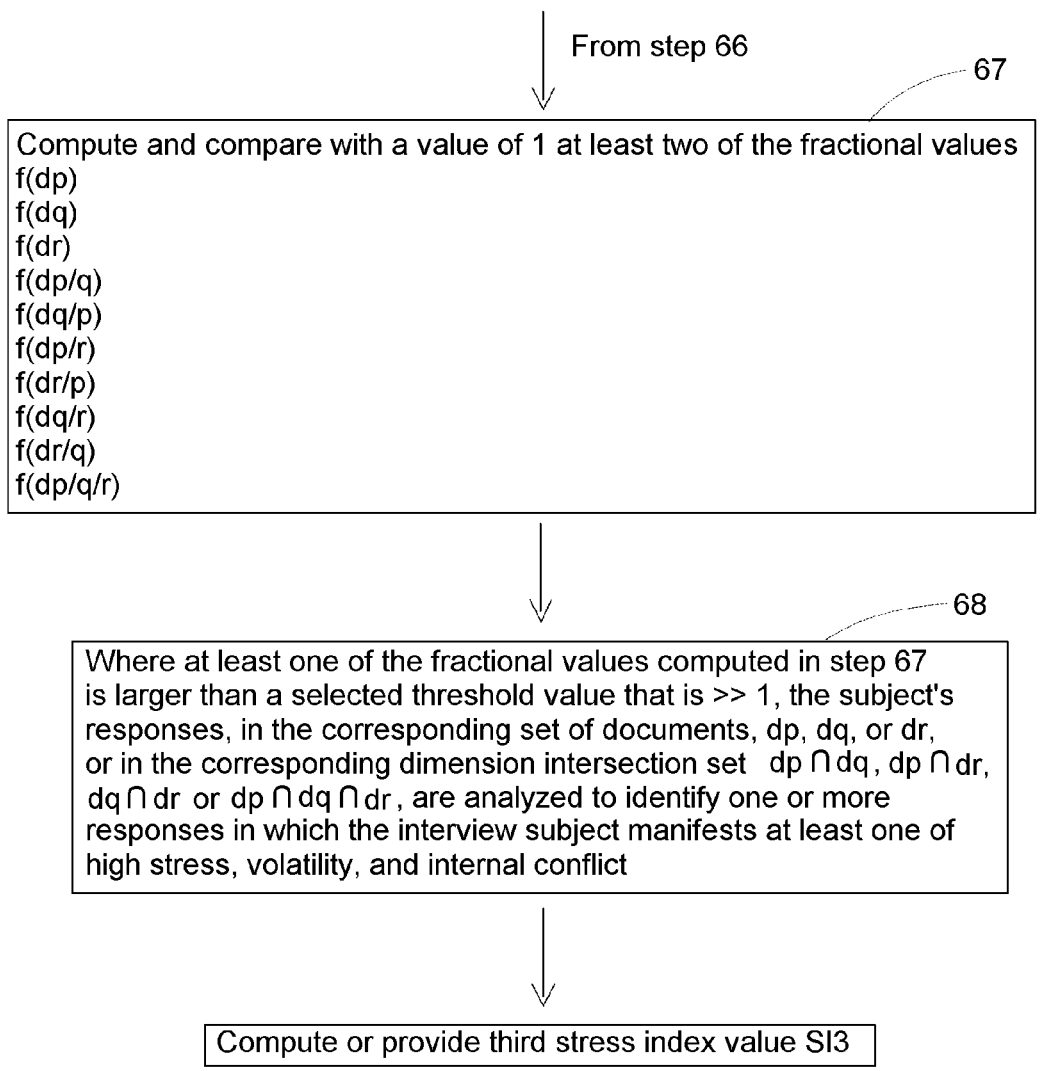

A flow chart in FIG. 6 illustrates implementation of an embodiment of a link analysis, as discussed in the preceding. In step 61, three dimensions, d1, d2 and d3 are selected and a first, second and third set of (possibly overlapping) documents, optionally labeled "d1", "d2" and "d3" and containing one or more words from the respective dimensions d1, d2 and d3, are identified. The dimension intersections, d1Ωd2, d1Ωd3, d2Ωd3 and d1Ωd2Ωd3, within each document in E(red) are identified, in step 62. In step 63, the values η(dp; np), η(dp/q; np/q) and η(dp/q/r; np/q/r) are determined or provided, respectively representing (i) number of times any word from a dimension dp appears in document number np of documents labeled dp, (ii) a number of times any word from an intersection dimension dpΩdq appears in document number np/q of the set of documents labeled dpΩdqΩdr and (iii) a number of times any word from an intersection dimension dpΩdqΩdr appears in document number np/q/r of the set of documents labeled dpΩdqΩdr, with p, q and r having distinct values from among the values 1, 2 and 3.

In step 64, the values W(dp), W(dq) and W(dr), representing the number of words, with multiple countings included, corresponding to the respective dimensions dp, dq and dr are determined or provided. In step 65, the value W(D), representing the number of words, with multiple countings included, in the set D of all documents in E(red), for all dimensions d considered, is determined or provided. In step 66, the values W(dpΩdq), W(dpΩdr), W(dqΩdr) and W(dpΩdqΩdr), representing the number of words, with multiple countings included, corresponding to the respective intersection dimensions dpΩdq, dpΩdr , dqΩdr and dpΩdqΩdr, are determined or provided.

In step 67, at least two of the following fractional values are computed and compared with a value of 1:

$$f_3(dp) = \eta(dp;np)/W(dp)/\{W(dp)/W(D)\} = \eta(dp;np)W(D)/W(dp)^2,$$

$$f_3 dq = \eta(dq;nq)W(D)/W(dq)^2,$$

$$f_3(dr) = \eta(dr;nr)W(D)/W(dr)^2,$$

$$f_3(dp/q) = \eta(dp/q;np/q)W(D)/W(dp\Omega dq)^2,$$

$$f_3(dq/p) = \eta(dq/p;nq/p)W(D)/W(dp\Omega dq)^2,$$

$$f_3(dp/r) = \eta(dp/r;np/r)W(D)/W(dp\Omega dr)^2,$$

$$f_3(dr/p) = \eta(dr/p;nr/p)W(D)/W(dp\Omega dr)^2,$$

$$f_3(dq/r) = \eta(dq/r;nq/r)W(D)/W(dq\Omega dr)^2,$$

$$f_3(dr/q) = \eta(dr/q;nr/q)W(D)/W(dq\Omega dr)^2,$$

$$f_3(dp/q/r) = \eta(dp/q/r;np/q/r)W(D)/W(dp\Omega dq\Omega dr)^2.$$

In step 68, where at least one of these fractional values computed in step 67 is larger than a selected threshold value (thr) that is much larger than 1 (for example, (thr)=2.1), the subject's responses in the corresponding set of documents, labeled as dp, dq, or dr, or in the corresponding dimension intersection set, labeled as dpΩdq, dpΩdr, dqΩdr, or dpΩdqΩdr, are analyzed to identify one or more responses in which the interview subject manifests at least one of high stress, emotional volatility and internal conflict.

In step 69, a third stress index value SI3 is computed, optionally by analogy with the second stress index value:

$$SI3(j) = \Sigma \epsilon\{f(d'/d'') - (thr)\} \cdot w(d';d'')$$

$$d'd'' \quad (C-11)$$

$$\epsilon\{x\} = x \quad (x > 0) \quad (C-12)$$
$$\qquad = 0 \quad (x \leq 0),$$

where w(d',d") are numerical weight values that may vary with d' and/or d"; and d' and d" refer to pairs of dimensions and intersection dimensions, as discussed in connection with Eqs. (C-1) through (C-10): (d'.d")=(dp, dpΩdq), (dpΩdq, dpΩdqΩdr).

The number K of dimensions d, chosen to be 3 in this embodiment, can be reduced to 2 by ignoring the dimension labeled as "dr" in FIG. 5 and elsewhere, in which event the relevant dimensions and intersection dimensions become dp, dq and dpΩdq, a total of $3=2^{K=2}-1$. The fractions $f_K$, for K=2, analogous to Eqs. (C-1) through C-10) and in step 67 of the flow chart in FIG. 6, become $$f_2(dp) = \eta(dp;np)/W(dp)/\{W(dp)/W(D)\} = \eta(dp;np)W(D)/W(dp)^2, \quad (C-11)$$

$$f_2 dq = \eta(dq;nq)W(D)/W(dq)^2, \quad (C-12)$$

$$f_2(dp/q) = \eta(dp/q;np/q)W(D)/W(dp\Omega dq)^2. \quad (C-13)$$

A flow chart, analogous to FIG. 6 but with K=2, will include only the dimensions dp, dq and dpΩdq; the word counts W(D), W(dp), W(dq) and W(dpΩdq); the document numbers np, nq, and np/q; and the word counts η(dp; np), η(dq; nq) and η(dp/q; np/q)

More generally, the number K may be increased to K≧4, in which event the total number of dimensions and intersection dimensions becomes $2^K-1$:15 for K=4, 31 for K=5, etc. The analog of the Venn diagram in FIG. 5 will generally display the K individual dimensions plus the $2^K-K-1$ intersection dimensions associated with K primary dimensions. The analysis for general K is analogous to the preceding analysis for K=2 and/or K=3, with the corresponding fractions being denoted $f_K$.

Appendix D. Differential Analysis of Subject Responses.

The link analysis formalism developed in Appendix C, can be extended to a differential analysis that considers a change, if any, in a fraction f, defined in one of the Eqs. (C-1) through (C-10), when a first intersection set, such as dpΩdq, is replaced by a second intersection set, such as dpΩdqΩdr of documents that is contained within the first set. If, for example, f(dp/q/r) is much larger than f(dp/q), this indicates that a high(er) correlation may be present within the documents in the intersection set labeled dp/q/r; and this increased correlation of emotions or states of mind (of dp and dq with dr) may indicate an interview subject with a particular state of mind. Where at least one of the emotions associated with the dimension dp or the emotion dq is present in the subject's responses, an enhancement of the emotion associated with the dimension dr will or should be present; if the emotion associated with the dimension dr is not manifest in the subject's responses, these responses may be contrived.

On the other hand, where the fraction f(dp/q/r) is much smaller then the fraction f(dp/q), this may indicate an "anti-correlation" or psychological antagonism of the emotion associated with the dimension dr with the combined emotions associated with the dimensions dp and dq. This response may indicate that, with this subject, occurrence of an emotion associated with the dimensions dp and dq is often inconsistent with occurrence of an emotion associated with the dimension dr. Where this combination (dimensions dp and/or dq antagonistic to dimension dr) is manifest, appearance of a strong emotion associated with the dimension dr simultaneously with appearance of a strong emotion associated with the dimension dp and/or dq, should be approached with skepticism or suspicion.

Appendix E, Construction of a Heat Map Based on Dimensions Analysis.

Figure 7:
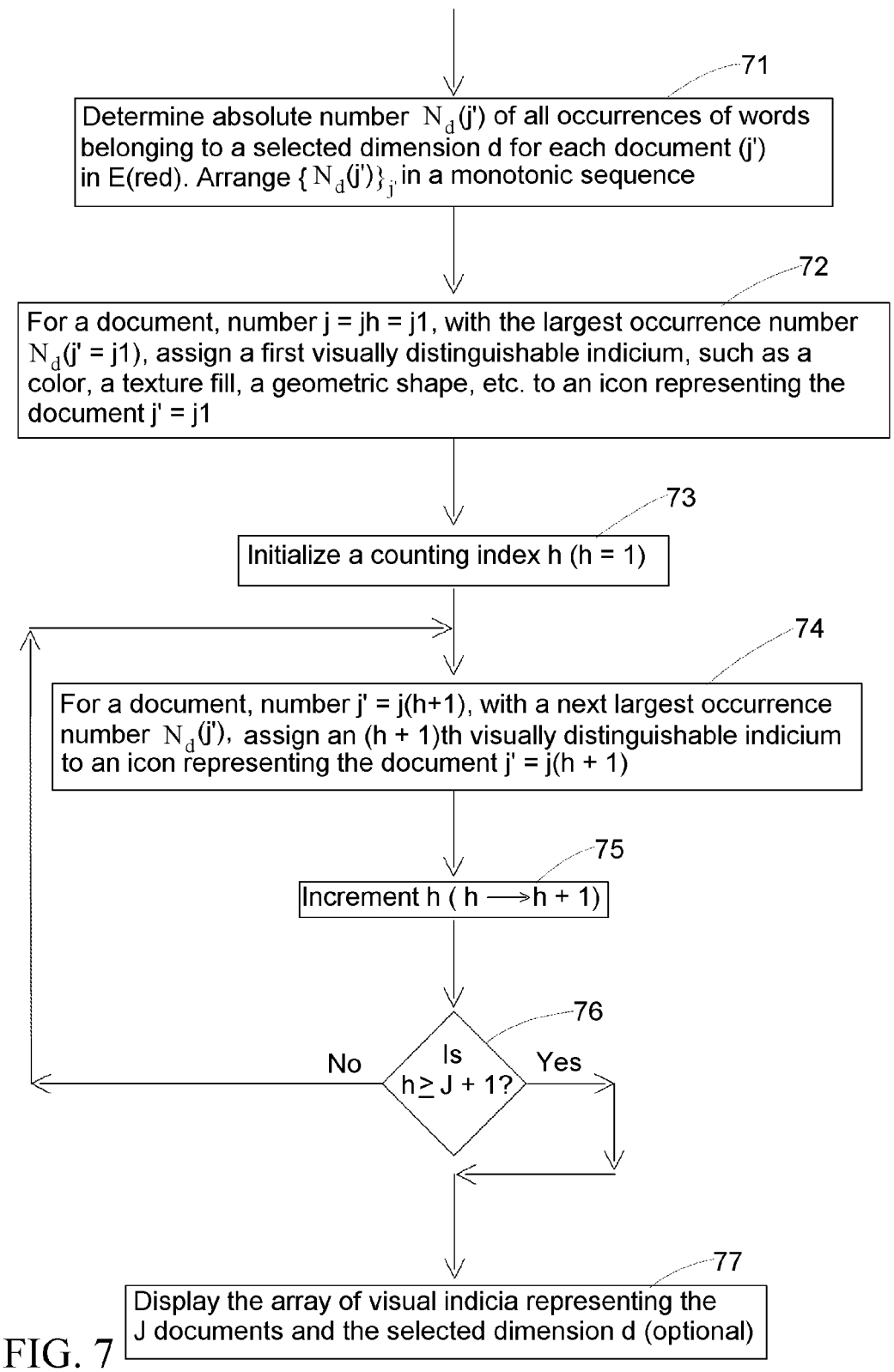
FIG. 7 illustrates a procedure for construction of a Heat Map according to a selected linguistic analysis.

A Heat Map is prepared by focusing on a particular dimension of a linguistic analysis (LIWC, Buddhist, etc.), for example, the dimension, d="sadness" in the LIWC analysis or the corresponding dimension in the Buddhist emotion analysis. The absolute number $N_d(j)$ (not fractional) occurrence of all words belonging to that dimension (e.g., 83 words for the dimension "sadness" in the LIWC analysis and 119 words in the Buddhist analysis, respectively) are determined or provided for each document in E(red) for a selected dimension d, in step 71 of a flow chart in FIG. 7. In step 72, a document, number j=j1=jh having a highest occurrence number $N_d(j=jh=j1)$ is assigned a first visually distinguishable color, fill texture, geometric shape or other indicium to an icon representing the document number j'=j1. In step 73, a counting index h is initialized (h=1).

In step 74, a document, number j=j(h+1), with a next highest number $N_d(j=j(h+1))$, is assigned a visually distinguishable color, fill texture, geometric shape or other indicium, number h+1. In step 75, the index h is incremented (h→h+1).

In step 76, the system determines if h≧J+1, where J is the number of documents in E(red). Where the answer to the query in step 76 is "no," the system returns to step 74, with an incremented value of h, and repeats steps 74-76. When the answer to the query in step 76 is "yes," the system moves to step 77, optionally displays the icons of visual indicia representing the J documents and the selected dimension d, and terminates the procedure.

All other documents with associated numbers $N_d(j)$ are arranged in a monotonically increasing (not necessarily strictly monotonically increasing) sequence of the numbers $N_d(j)$. Each document can be represented as a small geometric figure, such as a triangle, a rectangle, or a more general polygon, with each polygon having a fill color or fill texture. A user can now estimate, from a comparison of color, fill texture, geometric shape or other selected indicium in the Heat Map, which documents are "hottest" with respect to repeated use of words in a specified dimension (e.g., d="sadness"). Texture (manifested by alternating dark/light lines with varying line widths) and/or polygon sizes (manifested by a polygon diameter) may be used in place of varying colors to distinguish or manifest the "temperature" of a document in a Heat Map.

An example of a Heat Map is presented in grey scale in FIG. 8, which illustrates eight ranges of documents, numbered 0, 1, . . . , 7, with different grey scales, corresponding to the number of documents having words and/or phrases belonging to a selected dimension. Some documents have zero words and/or phrases from the chosen dimension; while others have q=1, 2, . . . , 6 or 7 words and/or phrases associated with the selected dimension.

Appendix F. Linguistic Inquiry Word Count Categories and Dimensions.

The 64 dimensions of an LIWC for related words identified by Pennebaker, Francis and Booth are divided into four categories, allocated as follows.

Parts of speech
Function words
Pronoun
Personal pronouns
First person singular
First person plural
Second person
Third person singular
Third person plural
Impersonal pronoun
Article
Verb
Auxiliary verb
Past tense
Present tense
Future tense
Adverbs
Prepositions
Conjunctions
Negations
Quantifiers
Numbers
Psychological
Swear words
Social processes
Family
Friends
Humans
Affective processes
Positive emotion
Negative emotion
Anxiety
Anger
Sadness
Cognitive mechanics
Insight
Causation
Factual discrepancy
Tentativeness, uncertainty
Certainty
Inclusive
Exclusive
Perpetual process
See
Hear
Feel
Personal
Biological process
Body
Health
Sexual
Ingestion
Relativity
Motion
Space
Time
Work
Achievement
Home
Money
Religion
Death
Spoken words
Assent
Non-fluences
Filter Words in the Psychological dimensions are more likely than others to be associated with high stress, volatile response and/or internal conflict.

Appendix G. Buddhist Dimensions and Categories.

Buddhist words expressing emotions and perspectives are divided into 12 dimensions, including 119 words as follows.

Fear: afraid; anxious; concerned; insecure; nervous; tense; worried

Guilt: ashamed; condemned; contemptible; convicted; damned; disgraced; judged; remorseful; sentenced; undeserving; villainous Sadness: blue; depressed; dejected; dismal; down; forlorn; gloomy; glum; low; melancholy; sorrowful Loneliness: abandoned; alone; aloof; bleak; desolate; detached; distant; empty; hollow; nothing; sunken; void; withdrawn Happiness: cheerful; delighted; elated; glad; humor; pleased; smile; thrilled Low self-worth: humiliated; ignored; left out; pathetic; rejected; shy; timid; unimportant; useless; worthless Confidence: assured; balanced; brave; certain; grounded; positive; proud; safe; stable; sure Uplifting: elevated; glorious; grand; height; lofty; magnificent; overhead; surpassing; sublime; surpassing; towering; transcendent Beauty: charm; delightful; elegance; excellence; glamour; grace; lovely; superior Space: astronomic; boundless; colossal; enormous; empty; expanse; sweeping; tremendous; unbounded; universe; unlimited; vast; void Time: endless; era; generation; interval; life time; season; space; span Travel: adventure; dive; journey; proceed; ramble; soar; trek; voyage Six of these dimensions (fear, guilt, sadness, loneliness, low self-worth confidence) are most likely to be associated with high stress, volatile response and/or internal conflict; any dimension may have with inaccurate statements.

Appendix H. First Example of Application of Emotion Analysis.

A first example of application of emotion analysis considers a portion of O. J. Simpson's responses to interrogation in the killing of Nicole Brown in 1994. This portion follows.

"Well, we tried to get back together, and it just didn't work. It wasn't working, and so we were going our separate ways. We tried to get back together for about a year, you know, where we started dating each other and seeing each other. She came back and wanted us to get back together, and . . . . She came back about a year and four months ago about us trying to get back together, and we gave it a shot. We gave it a shot the better part of a year. And I think we both knew it wasn't working, and probably three weeks ago or so, we said it just wasn't working, and we went our separate ways.

"Going down to . . . and cops down there know about it because I've told two marshals about it. At a mall, I was going down for a christening, and I had just left—and it was like 3:30 in the morning, and I'm in a lane, and also the car in front of me is going real slow, and I'm slowing down 'cause I figure he sees a cop, 'cause we were all going pretty fast. And I'm going to change lanes, but there's a car next to me, and I can't change lanes. Then that goes for a while, and I'm going to slow down and go around him but the car butts up to me, and I'm like caught between three cars. They were Oriental guys, and they were not letting me go anywhere. And finally I went on the shoulder, and I sped up, and then I held my phone up so they could see the light part of it, you know, 'cause I have tinted windows, and they kind of scattered, and I chased one of them for a while to make him think I was chasing him before I took off"

In the first of the preceding paragraphs, the phrase "back together" (underlined for emphasis) occurs four times; the phrases "didn't work" and/or "wasn't working" occur three times; the phrase "going/went our separate ways" occurs twice. These phrases, taken together, indicate an attempt to repair a relationship, and failure of that attempt. Repeated use of these phrases within a single paragraph may indicate a special focus or obsession by the subject with relationship repair—attempted and failed.

In the second of the preceding paragraphs, the word "down" occurs four times, but in two different contexts, "going down" and "slowing down." Repeated use of the word "down" rather than mixed use with one or more synonyms for "down" may indicate sadness or depression of the subject.

Each paragraph, taken from separate parts of the Simpson responses, appears to emphasize or focus upon a particular perspective. This supports, but does not require, a view that parts of the subject's responses are modularized or rehearsed.

Analysis of the O. J. Simpson interview(s) is preferably implemented using the first statistical analysis and the heat map analysis Appendix I. Second Example of Application of Emotion Analysis.

A second example of application of emotion analysis considers a portion of a letter left, possibly by the kidnappers, in the abduction of Jon Benet Ramsey from her home. This portion follows.

"Mr. Ramsey. Listen carefully! We are a group of individuals that represent a small foreign faction. We respect your bussiness but not the country that it serves. At this time we have your daughter in our posession. She is safe and unharmed and if you want her to see 1997, you must follow our instructions to the letter. You will withdraw $118,000.00 from your account. $100,000 will be in $100 bills and the remaining $18,000 in $20 bills. Make sure that you bring an adequate size attache to the bank. When you get home you will put the money in a brown paper bag. I will call you between 8 and 10 am tomorrow to instruct you on delivery. The delivery will be exhausting so I advise you to be rested. If we monitor you getting the money early, we might call you early to arrange an earlier delivery of the money and hence a earlier delivery pickup of your daughter. Any deviation of my instructions will result in the immediate execution of your daughter. You will also be denied her remains for proper burial. The two gentlemen watching over your daughter do not particularly like you so I advise you not to provoke them. Speaking to anyone about your situation, such as Police, F.B.I., etc., will result in your daughter being beheaded. If we catch you talking to a stray dog, she dies. If you alert bank authorities, she dies. If the money is in any way marked or tampered with, she dies. You will be scanned for electronic devices and if any are found, she dies. You can try to deceive us but be warned that we are familiar with Law enforcement countermeasures and tactics. You stand a 99% chance of killing your daughter if you try to out smart us. Follow our instructions and you stand a 100% chance of getting her back. You and your family are under constant scrutiny as well as the authorities. Don't try to grow a brain John. You are not the only fat cat around so don't think that killing will be difficult. Don't underestimate us John. Use that good southern common sense of yours. It is up to you now John! Victory! S.B.T.C."

In the preceding paragraph, the primary thrust is on the consequences if Mr. Ramsey does not follow the accompanying instructions or includes additional activities that are not explicitly approved in the letter's instructions. The paragraph includes one specific consequence: beheading of the Ramsey daughter. Although certain grammatical slips and misspellings are purposefully included (e.g., "bussiness" and "posession" and "Law enforcement"), the writer generally writes well and appears to be familiar with a Western writing style, including use of short sentence segments for special impact. The writer is more likely educated in the U.S. or in a territory or possession of the U.S.

In the latter portion of the preceding paragraph, the writer adopts an artificial familiarity by repeatedly addressing the recipient as "John." This does not indicate personal familiarity with Mr. Ramsey but appears to be used as a rhetorical device.

Analysis of the Jon Benet interviews is preferably implemented using the second and third statistical analyses.

What is claimed is:

1. A system of interviewing to estimate whether an interview subject is likely experiencing high stress, emotional volatility and/or internal conflict in the subject's responses to at least one of an interviewer's questions, the system comprising a computer that is programmed:

to receive a collection of responses, transcribed to written responses and numbered r=1, . . . , R (R≧2), with each response consisting of an ordered sequence of words, provided by or for an interview subject, in response to at least one question provided by an interviewer;

to analyze the subject's responses and determine if at least one of the following changes has been made: (i) the subject has replaced use of a first personal pronoun by subsequent use of a second personal pronoun, where the first pronoun has a first pronoun number, singular or plural, and the second pronoun has a second pronoun number that differs from the first pronoun number; (ii) the subject has replaced use of a first noun by subsequent use of a second noun that differs from the first noun; (iii) the subject has replaced use of a first adjective or adverb by subsequent use of a second adjective or adverb, whose interpretation is at least partly inconsistent with the interpretation of the first adjective or adverb; and (iv) the subject has replaced a use of a first verb tense in describing an action or event by subsequent use of a second verb tense, describing the action or event, that differs from the first verb tense;

assigning a selected non-negative change value to each change in personal pronoun, pronoun number, noun, adjective, adverb and verb tense in the subject's responses, and adding the selected non-negative change values to form a change sum, denoted Sum(change);

comparing the change sum with a threshold change value, denoted (thrΔ);

when Sum(change) is larger than (thrΔ), interpreting this condition as indicating that the subject is being purposefully ambiguous or untruthful;

analyzing the subject's responses to identify presence in the subject's responses of at least one of the following: (i) use by the subject of colloquial words and/or phrases that are used only in a selected geographical region asserted by the interrogation subject; (ii) use by the subject of a specific ordering of words in one or more phrases that is associated only with a selected geographical region asserted by the subject; and (iii) use and understanding by the subject of specific words and/or phrases that are associated with a line of work or profession asserted by the subject;

where the subject's use of a colloquial word or phrase does not support the subject's assertion concerning the selected geographical region, to interpret this condition as indicating that at least part of the subject's responses are not truthful;

where the subject's use of a specific ordering of words, in the one or more phrases associated only with a selected geographical region asserted by the subject, is not supported by the subject's response, to interpret this condition as indicating that at least part of the subject's responses are not truthful; and where the subject's response to at least one question concerning knowledge of a work practice asserted by the subject does not support the subject's assertion concerning the line of work or profession asserted by the subject, to interpret this condition as indicating that at least part of the subject's responses are not truthful.

2. A system of interviewing to estimate whether an interview subject is likely experiencing high stress, emotional volatility and/or internal conflict in the subject's responses to at least one of an interviewer's questions, the system comprising a computer that is programmed:

to receive a collection of responses by the subject, transcribed to written responses and numbered $r=1, \ldots, R$ ($R \geq 2$), with each response consisting of an ordered sequence of words, provided by or for an interview subject, in response to at least one question by an interviewer;

to assign each word in a reduced dictionary L(red) of words from the responses to at least one of D dimensions, numbered $d=1, \ldots, D$ ($D \geq 2$) with each dimension including words associated with a selected emotional state of mind of the subject;

to apply a first statistical analysis, for at least one selected dimension, where the first statistical analysis comprises:

(1-i) indexing each distinct word in L(red) in a selected dimension d1 with an index number, $i(m)$ ($m=1, \ldots, M$);

(1-ii) defining a subset $S\{M|i(m1), \ldots, i(mp); d1\}$ of all documents in which p specified words in L(red), indexed as $i(m1), i(m2), \ldots, i(mp)$ and belonging to the selected dimension d1, are present in each document in the subset;

(1-iii) defining $\eta_1(Q; d1)$ as a count of each word in a set Q of words in L(red) that belongs to the selected dimension d1, where multiple occurrences of a word are counted only once in the count;

(1-iv) defining a coverage parameter $CP\{S\{M|i(m1) \ldots, i(mp); d1\}\}/N(d1)$, where $N(d1)$ is the number of distinct words in L(red) that belong to the dimension d1;

(1-v) identifying at least one set $S\{M|i(m1), \ldots, i(mp); d1\}$, denoted $S_p(max)$, of words in L(red) that belong to the selected dimension d1 for which the value $CP\{S_p(max)\}$ is maximum for fixed d1; and (1-vi) identifying at least one document in $S_p(max)$ as a document in which the subject has manifested at least one of (i) high stress, (ii) emotional volatility, and (iii) substantial internal conflict, in responding to one or more questions.

3. A system of interviewing to estimate whether an interview subject is likely experiencing high stress, emotional volatility and/or internal conflict in the subject's responses to at least one of an interviewer's questions, the system comprising a computer that is programmed:

to receive a collection of responses by the subject, transcribed to written responses and numbered $r=1, \ldots, R$ ($R \geq 2$), with each response consisting of an ordered sequence of words, provided by or for an interview subject, in response to at least one question by an interviewer;

to assign each word in a reduced dictionary L(red) of words from the responses to at least one of D dimensions, numbered $d=1, \ldots, D$ ($D \geq 2$) with each dimension including words associated with a selected emotional state of mind of the subject;

to apply a second statistical analysis, for at least one selected dimension, where the second statistical analysis comprises:

(2-i) determining a sum, denoted Sum(d2), of the number of occurrences of words in the reduced set L(red) that belong to a selected dimension d2 for each of the collection of responses, for at least one selected dimension d2;

(2-ii) providing a mean $\mu(d2)$ and a standard deviation $\sigma(d2)$ of the number of occurrences of words in the dimension d2 in the collection of responses by the subject;

(2-iii) determining if the sum Sun(d2) satisfies $Sum(d2) > \mu(d2) + k \cdot \sigma(d2)$ for a selected positive number $k \geq 1$; and (2-iv) where Sum(d2) satisfies $Sum(d2) \geq \mu(d2) + k \cdot \sigma(d2)$, interpreting this condition as indicating that the subject, at a time a document was prepared, was experiencing at least one of (i) high stress, (ii) emotional volatility, and (iii) substantial internal conflict in one or more of the subject's responses.

4. The system of claim 3, wherein said computer is further programmed:

to form a stress index value SI2(j), defined as $$SI2(j) = \Sigma_d \varepsilon\{f(d;j) - F(d;k)\} \cdot w(d;j)$$

$$\varepsilon\{x\} = x \quad (x > 0)$$
$$= 0 \quad (x \leq 0),$$

where w(d; j) is a selected non-negative weight value that may depend upon characteristics of the dimension d; and to compare the stress index value SI2(j) with a selected positive threshold value (thr2).

5. A system of interviewing to estimate whether an interview subject is likely experiencing high stress, emotional volatility and/or internal conflict in the subject's responses to at least one of an interviewer's questions, the system comprising a computer that is programmed:

to receive a collection of responses by the subject, transcribed to written responses and numbered r=1, . . . , R (R≧2), with each response consisting of an ordered sequence of words, provided by or for an interview subject, in response to at least one question by an interviewer;

to assign each word in a reduced dictionary L(red) of words from the responses to at least one of D dimensions, numbered d=1, . . . , D (D≧2) with each dimension including words associated with a selected emotional state of mind of the subject;

to apply a third statistical analysis, for at least one selected dimension, where the third statistical analysis comprises:

(5-i) for first, second and third dimensions, denoted dp, dq and dr, respectively, of words drawn from the reduced subset L(red), let dpΩdq denote a set of all words in L(red) that belong to dimension dp and belong to dimension dq, and to dp, and let dpΩdqΩdr denote a set of all words in L(red) that belong to dimension dp and to dimension dq and to dimension dr, with p, q and r having distinct values from among the values 1, 2 and 3;

(5-ii) letting indices np=1, . . . , Np, nq=1, . . . , Nq and nr=1, . . . , Nr denote counting indices for documents having at least one word in L(red) that belongs to the dimensions dp, dq and dr, respectively;

(5-iii) letting np/q, np/k and nq/k denote counting indices for documents having at least one word in L(red) that belongs to intersection dimensions dpΩdq, to dpΩdr and to dqΩdr, respectively;

(5-iv) letting np/q/r denote a counting index for documents having at least one word in L(red) that belongs to dpΩdqΩdr;

(5-v) letting η(dp; np), η(dq; nq) and η(dr; nr) denote the number of times a word from the respective dimension dp, dq and dr appears in the document indexed as np, nq and nr;

(5-vi) letting η(dp/q; np/q), η(dp/r; np/r) and η(dq/r; nq/r) denote the number of times a word from the respective intersection dimensions dp/q, dp/r and dq/r appears in the respective document indexed as np/q, np/er and nq/r;

(5-vii) letting η(dp/q/r; np/q/r) denote the number of times a word from the intersection dimension dp/q/r appears in the document indexed as np/q/r;

(5-viii) letting W(dp), W(dq) and W(dr) denote the total number of words, with multiple countings of a word included where present, within L(red) that belong to the respective dimensions dp, dq and dr;

(5-ix) computing at least one dimension intersection function, defined as $$f_3(dp) = \eta(dp;np)/W(dp)/\{W(dp)/W(D)\} = \eta(dp;np)W(D)/W(dp)^2,$$

$$f_3(dq) = \eta(dq;nq)W(D)/W(dq)^2,$$

$$f_3(dr) = \eta(dr;nr)W(D)/W(dr)^2,$$

$$f_3(dp/q) = \eta(dp/q;np/q)W(D)/W(dp\Omega dq)^2,$$

$$f_3(dq/p) = \eta(dq/p;nq/p)W(D)/W(dp\Omega dq)^2,$$

$$f_3(dp/r) = \eta(dp/r;np/r)W(D)/W(dp\Omega dr)^2$$

$$f_3(dr/p) = \eta(dr/p;nr/p)W(D)/W(dp\Omega dr)^2$$

$$f_3(dq/r) = \eta(dq/r;nq/r)W(D)/W(dq\Omega dr)^2$$

$$f_3(dr/q) = \eta(dr/q;nr/q)W(D)/W(dq\Omega dr)^2$$

$$f_3(dp/q/r) = \eta(dp/q/r;np/q/r)W(D)/W(dp\Omega dq\Omega dr)^2,$$

and comparing at least one of the computed fractions with a selected threshold fraction value (thr);

(5-x) when f(dp/q) is substantially larger than (thr), interpreting this condition as indicating that the fraction of words in the intersection dimension dpΩdq is substantially larger than the fraction of words in at least one of the dimensions dp and dq, for the document np/q, and that the document np/q should be examined further for indications of high stress and/or internal conflict in the subject's responses;

(5-xi) when f(dp/q/r) is substantially larger than (thr), interpreting this condition as indicating that the fraction of words in the intersection dimension dpΩdqΩdr is substantially large than the fraction of words in at least one of the dimensions dp and dq and dr, and that the document np/q/r should be examined further for indications of high stress and/or internal conflict in the subject's responses; and (5-xii) when f(dp/q/r) is substantially larger than max{f(dp/q), f(dp/r), f(dq/r)} interpreting this condition as indicating that the fraction of words in the intersection dimension dpΩdqΩdr is substantially large than the fraction of words in any of the intersection dimensions dpΩdq, dpΩdr and dqΩdr and that the document np/q/r should be examined further for indications of high stress and/or internal conflict in the subject's responses.

6. The system of claim 5, wherein said computer is further programmed:

to form a stress index value SI3(j), defined as $$SI3(j) = \Sigma_{d',d''} \varepsilon\{f(d'/d'') - (thr)\} \cdot w(d';d'')$$

$$\varepsilon\{x\} = x \quad (x > 0)$$
$$= 0 \quad (x \leq 0),$$

where (thr) is a selected non-negative threshold value, w(d', d'') are non-negative weight values that may vary with dimensions d' and/or d'', d' and d'' refer to pairs of said dimensions and said intersection dimensions, and f(d'/d'') is said at least one dimension intersection function, with (d'.d")=(dp, dpΩdq) or (dpΩdq, dpΩdqΩdr); and to compare the stress index value SI3($j$) with a selected positive threshold value (thr3).

7. A system of interviewing to estimate whether an interview subject is likely experiencing high stress, emotional volatility and/or internal conflict in the subject's responses to at least one of an interviewer's questions, the system comprising a computer that is programmed:

to receive a collection of responses by the subject, transcribed to written responses and numbered r=1, ..., R (R≧2), with each response consisting of an ordered sequence of words, provided by or for an interview subject, in response to at least one question by an interviewer;

to assign each word in a reduced dictionary L(red) of words from the responses to at least one of D dimensions, numbered d=1, ..., D (D≧2) with each dimension including words associated with a selected emotional state of mind of the subject;

to apply a third statistical analysis, for at least one selected dimension, where the third statistical analysis comprises:

(7-i) for first and second dimensions, denoted dp and dq, respectively, of words drawn from the reduced subset L(red), let dpΩdq denote a set of all words in L(red) that belong to dimension dp and belong to dimension dq, with p and q having distinct values from among the values 1 and 2;

(7-ii) letting indices np=1, ..., Np and nq=1, ..., Nq denote counting indices for documents having at least one word in L(red) that belongs to the dimensions dp and dq, respectively;

(7-iii) letting np/q denote a counting index for documents having at least one word in L(red) that belongs to an intersection dimension dpΩdq;

(7-iv) letting η(dp; np) and η(dq; nq) denote the number of times a word from the respective dimension dp and dq appears in the document indexed as np and as nq;

(7-v) letting η(dp/q; np/q) and η(dp/r; np/r) denote the number of times a word from the intersection dimensions dp/q appears in the document indexed as np/q;

(7-vi) letting W(dp) and W(dq) denote the total number of words, with multiple countings of a word included where present, within L(red) that belong to the respective dimensions dp and dq;

(7-vii) computing at least one dimension intersection function, defined as $$f_2(dp)=\eta(dp;np)/W(dp)/\{W(dp)/W(D)\}=\eta(dp;np)W(D)/W(dp)^2,$$

$$f_2 dq)=\eta(dq;nq)W(D)/W(dq)^2,$$

$$f_2(dp/q)=\eta(dp/q;np/q)W(D)/W(dp\Omega dq)^2,$$

and comparing the computed fraction $f_2(dp/q)$ with a selected threshold fraction value (thr); and (7-viii) when $f_2(dp/q)$ is substantially larger than (thr), interpreting this condition as indicating that the fraction of words in the intersection dimension dpΩdq is substantially larger than the fraction of words in at least one of the dimensions dp and dq, for the document np/q, and that the document np/q should be examined further for indications of high stress and/or internal conflict in the subject's responses.

8. The system of claim 7, wherein said computer is further programmed:

to form a stress index value SI2($j$), defined as $$SI2(j)=\epsilon\{f_2(dp/q)-(thr)\}$$

$$\epsilon\{x\} = x \quad (x > 0)$$
$$= 0 \quad (x \leq 0),$$

where (thr) is a selected non-negative threshold value; and to compare the stress index value SI2($j$) with a selected positive threshold value (thr2).

* * * * *